US006249501B1

(12) United States Patent

Nakamura et al.

(10) Patent No.: US 6,249,501 B1

(45) Date of Patent: Jun. 19, 2001

(54) RECORDING APPARATUS WITH RESILIENT DISPLACEMENT MEMBER AND LIMITER MECHANISM

(75) Inventors: Tadami Nakamura, Saitama; Kazuhito Kurita, Kanagawa; Toshihiro Kusunoki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/167,854

(22) Filed: Oct. 7, 1998

(30) Foreign Application Priority Data

Oct. 9, 1997 (JP) .................................................. 9-277501

(51) Int. Cl.$^{7}$ ............................ G11B 33/02; G11B 17/04

(52) U.S. Cl. ............................................................ 369/77.2

(58) Field of Search ................................. 369/75.1, 75.2, 369/77.1, 77.2, 99.02, 99.06

(56) References Cited

U.S. PATENT DOCUMENTS 5,638,351 * 6/1997 Kanada et al. ...................... 369/77.2

FOREIGN PATENT DOCUMENTS 63-228453 * 9/1988 (JP) .

* cited by examiner

*Primary Examiner*—David L. Ometz

(74) *Attorney, Agent, or Firm*—Oblon, Spivak, McClelland, Maier & Neustadt, P.C.

(57) ABSTRACT

A recording apparatus of a recording medium is comprised of a lid, a lock mechanism, an operating mechanism and a transmitting mechanism. The lid is rotatably arranged at the main body of the apparatus so as to open or close an installing part for the recording medium. The lock mechanism locks the lid at a closed position against the main body of the apparatus. The operating mechanism is arranged at the main body of the apparatus. The transmitting mechanism is arranged between the operating mechanism and the lock mechanism. The transmitting mechanism has a resilient displacement member for use in transmitting an operation of the operating mechanism to the lock mechanism. The resilient displacement member is moved between a transmitting position where an operation of the operating mechanism is transmitted to the lock mechanism to release the locked state of the lid with the lock mechanism and a non-transmitting position where it is retracted from the operating mechanism and the lock mechanism.

17 Claims, 34 Drawing Sheets

F I G. 12
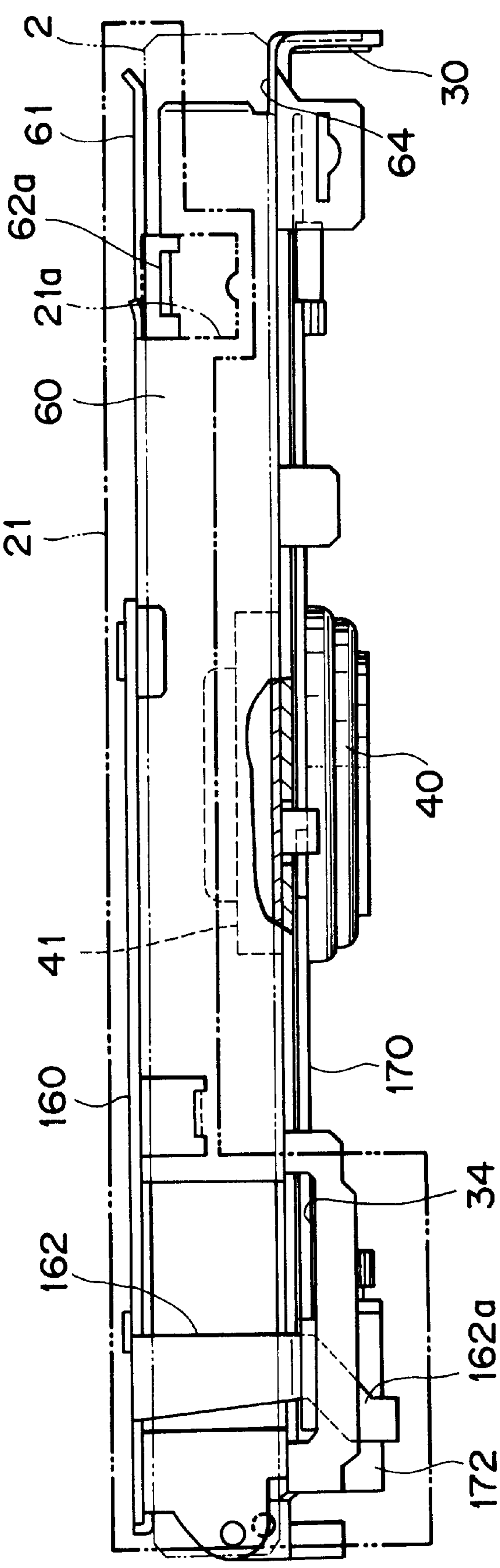

RECORDING APPARATUS WITH RESILIENT DISPLACEMENT MEMBER AND LIMITER MECHANISM

BACKGROUND

1. Field of the Invention

This invention relates to a recording apparatus of a recording medium. More particularly, this invention relates to a recording apparatus of a recording medium in which the recording medium may not be ejected until a recording operation of the recording medium is completed.

2. Background of the Invention

For example, there has been provided a recording and reproducing apparatus in which recording and/or reproducing of information signal is carried out under application of recording media such as a magneto-optic disk or an optical disk, either the magneto-optic disk or optical disk is installed at a predetermined fixing position on a chassis or ejected from the installing position under a state in which a disk cartridge having the recording media stored therein is held at a cartridge holder.

In such a recording and reproducing apparatus, as an ejecting operation for ejecting the disk cartridge is operated, a locked state at the installing position for the cartridge holder is released, resulting in that the disk cartridge can be rejected from the cartridge holder. However, if a taking-out operation of the recording medium, i.e. an ejecting operation is carried out during performing a writing (recording) or reading-out (reproduction) of information signal for the recording medium, data written into the recording medium is lost or the recording medium or the like is damaged.

There is also provided a system in which an ejection transmitting member is arranged between a member operated by an ejecting operation of an operator and a mechanism for releasing a locked state of a cartridge holder, the ejection transmitting member is retracted from between the member operated by the ejecting operation and the locked state releasing mechanism during writing or reading-out operation for the information signal in respect to the recording medium and even if the operator performs an erroneous ejecting operation, this operation is not transmitted to the locked state releasing mechanism.

However, in the case that a safety mechanism against the erroneous ejecting operation is employed, if a recording or reproducing operation is stopped during the ejecting operation and the ejection transmitting member is tried to return back to its original position, the member operated under the ejecting operation moves in advance to a return expected position of the transmitting member, resulting in that there is a possibility that the member operated by the ejecting operation and the ejection transmitting member may interfere to each other and the ejection transmitting member or the like may be damaged.

In view of the foregoing fact, it becomes necessary to provide a limiter mechanism for use in preventing the ejection transmitting member caused by interference between the ejection transmitting member and the member operated by the ejecting operation from being damaged.

In the related art, there has been provided an ejecting mechanism having the limiter mechanism described above as shown in FIGS. 1 to 3, for example.

There is provided a predetermined clearance (c) between an ejecting slider (a) moved toward a direction of arrow D as viewed in FIG. 1 under an ejecting operation of an operator and a lock slider (b) moved toward a direction of an arrow E in FIG. 1 for releasing a locked state against a cartridge holder not shown under a state in which each of them occupies its initial position, i.e. a position where the ejecting operation is not carried out. Moving forces directed toward each of a direction opposite to a direction of arrow D and another direction opposite to a direction of arrow E are resiliently biased against the ejecting slider (a) and the lock slider (b).

The ejection transmitting member (d) is supported at the extremity end of the magnetic head ascending or descending slider (e).

The magnetic head ascending or descending slider (e) is moved in a direction of an arrow F of FIG. 1 during recording and reproducing operations and when the recording operation is carried out, a magnetic head not shown is contacted to or approached to a magneto-optic disk through a cooperating mechanism not shown.

The ejection transmitting member (d) is formed to be elongated substantially in a forward or rearward direction, and a transmitting section (g) is projected from the front end of a supported section (f). At the rear end of the supported section (f), a spring hook piece (h) is projected to a side part.

The supported section (f) is formed with supported holes (i) and (j). Supporting pins (k), (k) buried and arranged at the magnetic head ascending or descending slider (e) are passed and inserted into these supported holes (i), (j) and then the ejection transmitting member (d) is supported by them at the magnetic head ascending or descending slider (e). The supported hole (j) at the rear side is formed to be elongated in a forward or a rearward direction and its width is formed to be substantially the same as or slightly larger than an outer diameter of the supporting pin (k) The supported hole (i) at the front side has its length in a forward or a rearward direction formed to be the same as that of the supported hole (j) at the rear side, the width at the rear half section is formed to be substantially twice as that of the rear side supported hole (j).

A tensile coil spring (m) is tensioned and arranged between the spring hook piece (1) formed to be projected to a side part of the front end of the magnetic head ascending or descending slider (e) and a spring hook piece (h) of the ejection transmitting member (d). Then, to this ejection transmitting member (d) are biased a motion force directed toward a front side of it, i.e. a motion force directed toward the direction of arrow G in FIG. 1 and a rotating force directed toward the direction of arrow H in FIG. 1, respectively. In this way, the ejection transmitting member (d) is set such that the supporting pin (k) is abutted against the rear end of the rear side supported hole (j) and the supporting pin (k) is abutted against the right edge of the front side supported hole (i) under a state in which no external force is applied to the ejection transmitting member (d) and then under this condition, the transmitting section (g) is positioned at the clearance (c) between the ejection slider (a) and the lock slider (b). This state is an initial state shown in FIG. 1.

When the ejecting operation is carried out from the initial state shown in FIG. 1 and the ejection slider (a) is moved in a direction of arrow D in FIG. 1, the transmitting section (g) is pushed by the ejection slider (a), the ejection transmitting member (d) is rotated in a direction opposite to the direction of arrow H in FIG. 1 until the left side edge of the supported hole (i) is abutted against the supporting pin (k), its transmitting section (g) pushes the lock slider (b) toward a direction of the arrow E in FIG. 1 and then the lock slider (b) moves toward a direction of arrow E in FIG. 1. The lock slider (b) moves in a direction of arrow E and a locked state of the cartridge holder at its installed position is released as shown in FIG. 2.

When either a recording operation or a reproducing operation is carried out, the magnetic head ascending or descending slider (e) is retracted in a direction of arrow F in FIG. 1, thereby the transmitting section (g) of the ejection transmitting member (d) is retracted rearwardly from the clearance (c) between the ejecting slider (a) and the lock slider (b). Accordingly, even if an operator erroneously performs an ejecting operation when a recording operation or a reproducing operation is carried out, motion of the ejecting slider (a) in a direction of arrow D in FIG. 1 shows a so-called non-operation and then the lock slider (b) does not move in a direction of arrow E in FIG. 1.

However, when either the recording or reproducing is stopped during an ejecting operation and the ejection transmitting member (d) tries to return back to its original position, there sometimes occurs that the ejecting slider (a) moved in a direction of arrow D in FIG. 1 at the return expecting position of the transmitting member (d) under an ejecting operation is moved in advance. In such a case as above, although the transmitting section (g) of the ejection transmitting member (d) strikes against the ejection slider (a), the tensile coil spring (m) is extended as shown in FIG. 3, the ejection transmitting member (d) is retracted relatively in respect to the magnetic head ascending or descending slider (e) so as to prevent the ejection transmitting member or the ejection slider (a) or the like from being damaged.

However, in the case of the aforesaid limiter mechanism, it was necessary to arrange two supporting pins (k), (k) and the tensile coil spring (m) in addition to the ejection transmitting member (d), resulting in that a number of component parts was required, the number of assembling steps was increased and they produced a problem of increasing cost. In addition, in correspondence with the increased number of component parts, there occurs a problem that a large space is required for installation of the component parts.

SUMMARY OF THE INVENTION

It is therefore an object of the present invention to provide a recording apparatus of a recording medium which resolves the above-mentioned problem.

According to the present invention, there is provided a recording apparatus of a recording medium including a lid member; a lock mechanism; an operating mechanism; and a transmitting mechanism. The lid is rotatably arranged at the main body of the apparatus. The lock mechanism locks the lid member at a closed position in respect to the main body of the apparatus. The operating mechanism is arranged at the main body of the apparatus. The transmitting mechanism is arranged between the operating mechanism and the lock mechanism. The transmitting mechanism has a resilient displacement member for use in transmitting an operation performed by the operating mechanism to the lock mechanism. The resilient displacement member may transmit an operation of the operating mechanism to the lock mechanism between the operating mechanism and the lock mechanism and the displacement member is moved between a transmitting position where the locked state of the lid is released by the lid member with the lock mechanism and a non-transmitting position where it is retracted from the operating mechanism and the lock mechanism.

According to the present invention, there is provided a recording apparatus of a recording medium including a recording section; a main body of the apparatus; a lid member; a releasing mechanism; an operating mechanism; and a transmitting mechanism. The recording section performs a recording at the recording medium. The main body of the apparatus is provided with the recording section. The lid member is rotatably arranged at the main body of the apparatus. The releasing mechanism releases the locked state of the lid locked at the closed position in respect to the main body of the apparatus. The operating mechanism is installed at the main body of the apparatus. The transmitting mechanism is arranged between the operating mechanism and the releasing mechanism. The transmitting mechanism has a resilient displacement member for transmitting an operation performed by the operating mechanism to the releasing mechanism. The resilient displacement member may transmit an operation of the operating mechanism between the operating mechanism and the releasing mechanism to the releasing mechanism so as to release the locked state of the lid member by the releasing mechanism. The resilient displacement member is moved up to a position where it is retracted from the operating mechanism and the releasing mechanism during a period in which at least a recording operation of the recording medium with the recording section is completed.

According to the present invention, there is provided a recording apparatus of a recording medium including a head mechanism; a main body of the apparatus; a lid member; a releasing mechanism; an operating mechanism; and a transmitting mechanism. The head mechanism performs a recording on the recording medium. The main body of the apparatus is provided with the head mechanism. The lid member is rotatably arranged at the main body of the apparatus. The releasing mechanism releases the locked state of the lid member locked at the position closed against the main body of the apparatus. The operating mechanism is arranged at the main body of the apparatus. The transmitting mechanism is arranged between the operating mechanism and the releasing mechanism. The transmitting mechanism has a resilient displacement member for transmitting an operation of the operating mechanism to the releasing mechanism. The resilient displacement member may transmit an operation of the operating mechanism between the operating mechanism and the releasing mechanism to the releasing mechanism and is moved between a transmitting position where the locked state of the lid member is released by the releasing mechanism and a non-transmitted position where it is retracted from the operating mechanism and the releasing mechanism. The resilient displacement member is moved to the non-transmitting position during a period in which the head mechanism is being moved to the recording position where a recording is carried out on the recording medium.

BRIEF DESCRIPTION OF THE DRAWINGS

FIGS. 1 to 3 illustrate top plan views for showing the related art limiter mechanism, wherein FIG. 1 is a view for showing an initial state, FIG. 2 is a view for showing a state in which a transmitting section is acted, FIG. 3 is a view for showing a state in which a limiter function is performed.

FIG. 12 is a schematic left side elevational view for showing a state in which a recording and reproducing apparatus at a mechanical chassis and a cartridge performs a recording operation.

FIGS. 19 to 27 are right side elevational views for showing a substantial part installed at a loading position where the disk cartridge is held at the cartridge holder and for showing an operation performed until it is ejected from the cartridge holder, wherein FIG. 19 shows a state in which the disk cartridge is started to be inserted into the cartridge holder, FIG. 20 shows a state in which the disk cartridge is changed from the state shown in FIG. 19 to a state in which the cartridge is further inserted into the cartridge holder, FIG. 21 shows a state in which the disk cartridge is completely inserted into the cartridge holder and a release slider acting as a part for ejecting the disk cartridge from the cartridge holder is locked, FIG. 22 shows a state in which the cartridge holder is in the way to turn from the ejected position to the loading position, FIG. 23 shows a state in which the cartridge holder approaches from a state shown in FIG. 22 to a loading position, FIG. 24 shows a state in which the cartridge holder is reached to a loading position, FIG. 25 shows an instant state in which the cartridge holder starts to move toward an ejecting position and a locked state in respect to the release slider is released, FIG. 26 shows a state in which a release slider is moved in a forward direction subsequent to the state shown in FIG. 25, FIG. 27 shows a state in which the release slider reaches the ejecting position.

FIGS. 32 to 35 are top plan views for illustrating substantial parts of the ejection transmitting member and the magnetic head ascending or descending slider, wherein FIG. 32 shows a state in a stopped condition of the recording and reproducing apparatus, FIG. 33 shows a state in which the ejection transmitting member transmits a motion of the ejection slider to a lock slider, FIG. 34 shows a state under a recording mode, FIG. 35 shows a state in which the ejection transmitting member performs a function of limiter.

DESCRIPTION OF THE INVENTION

Figure 1:
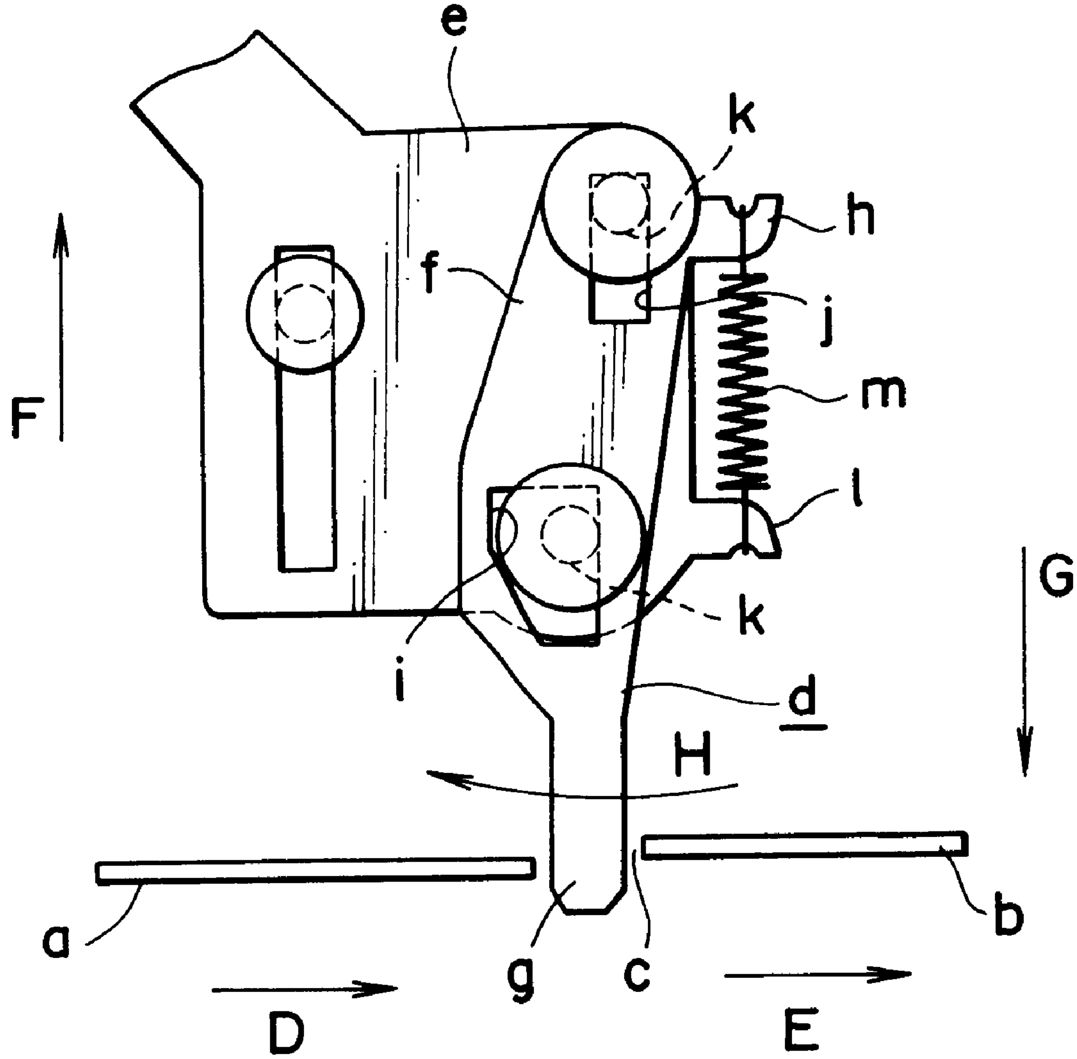
Figure 2:
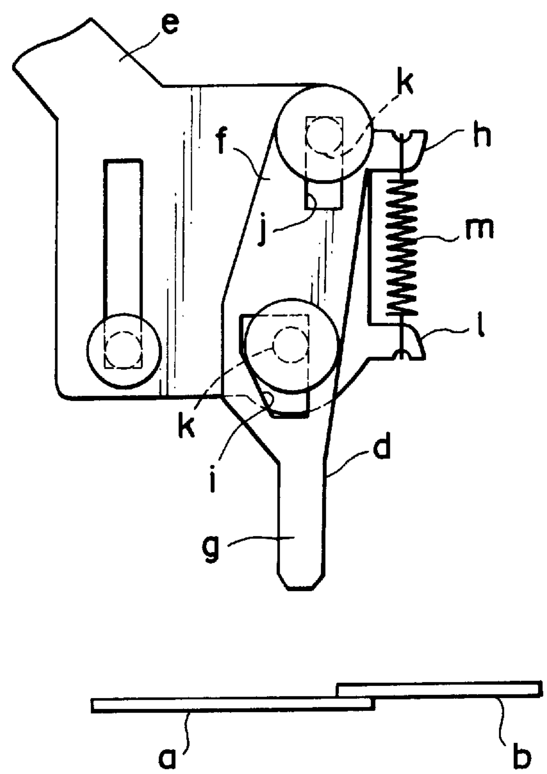
Figure 3:
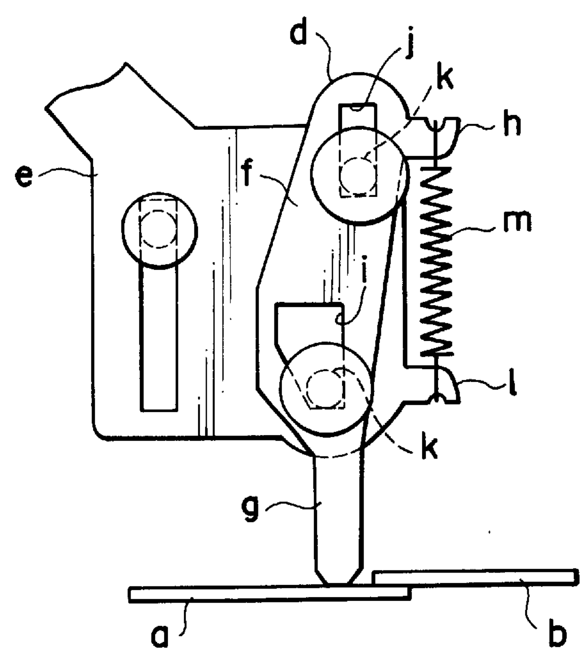

Referring now to the drawings, some preferred embodiments of the recording and reproducing apparatus of the present invention will be described in detail.

In the preferred embodiments described below, a recording and reproducing apparatus using a disk-like recording medium as a recording and reproducing device will be described.

Figure 4:
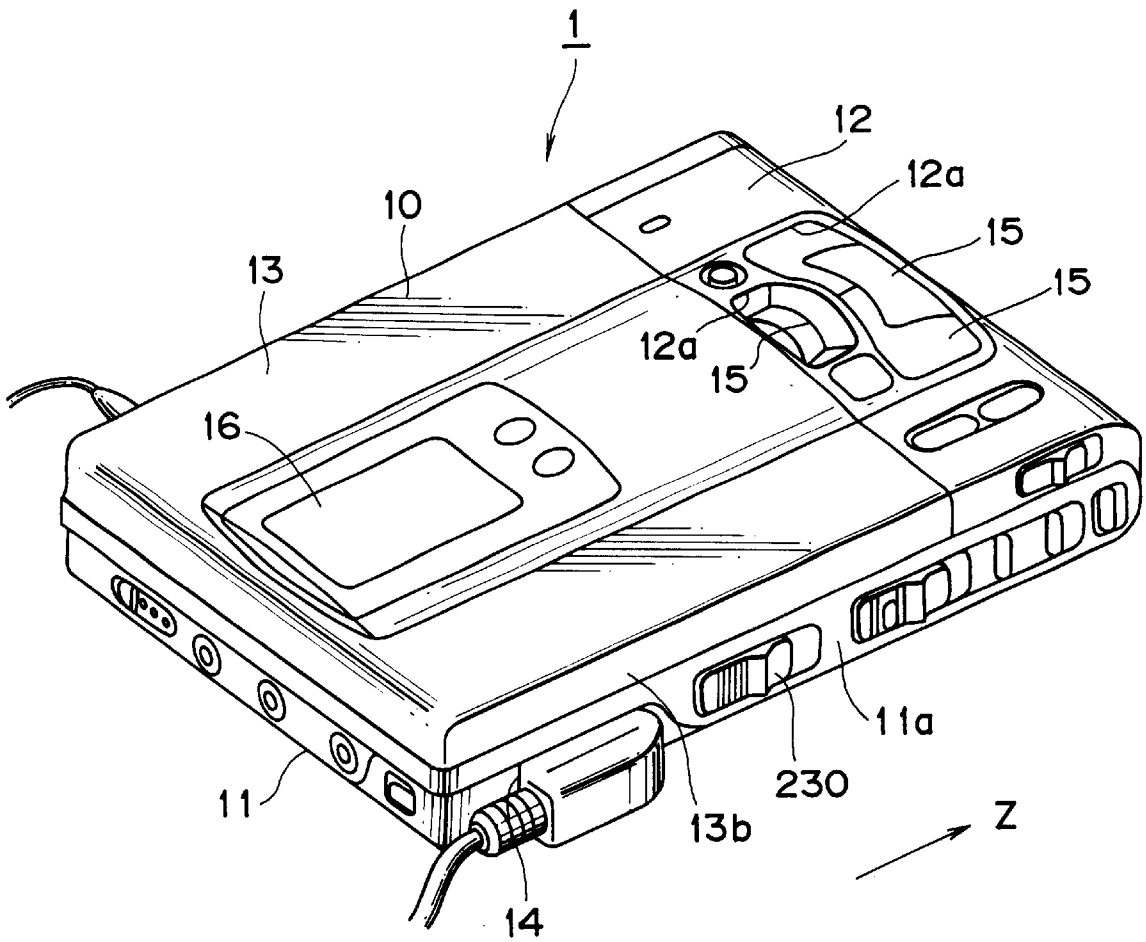
FIG. 4 is a perspective view for showing an outer appearance of a recording and reproducing apparatus of the preferred embodiment of the present invention.

A recording and reproducing apparatus 1 of the preferred embodiment of the present invention shown in FIG. 4 is constructed to apply a disk cartridge 2 in which either a magneto-optic disk or an optical disk acting as a disk-like recording medium is rotatably stored in the main body of a cartridge.

A magneto-optic disk 3 is constructed such that a signal recording layer made of magnetic material is coated on and formed at a disk substrate made of synthetic resin such as polycarbonate with a diameter of about 64 mm. This signal recording layer is locally heated more than a so-called Curie temperature under radiation of a collected laser beam, an external magnetic field is applied to this heated section to cause information signal to be written in it. The information signal written in this way is read out by radiating a linear deflected optical flux such as a laser beam against the signal recording layer and detecting the rotation of an optical deflecting direction under a so-called car effect of the optical flux reflected by the signal recording layer.

The optical disk is constructed such that the reflecting layer made of metallic material such as aluminum is coated on and formed at a disk substrate which is similar to the disk substrate of the magneto-optic disk 3. Some rows of fine pits corresponding to the information signal are formed on the disk substrate of the optical disk by an injection molding process. The information signal written into this optical disk is read out by radiating a coherent optical flux such as a laser beam against rows of pits and detecting a variation of optical amount caused by dispersion or interference at a signal recording layer of the reflected optical flux.

Figure 5:
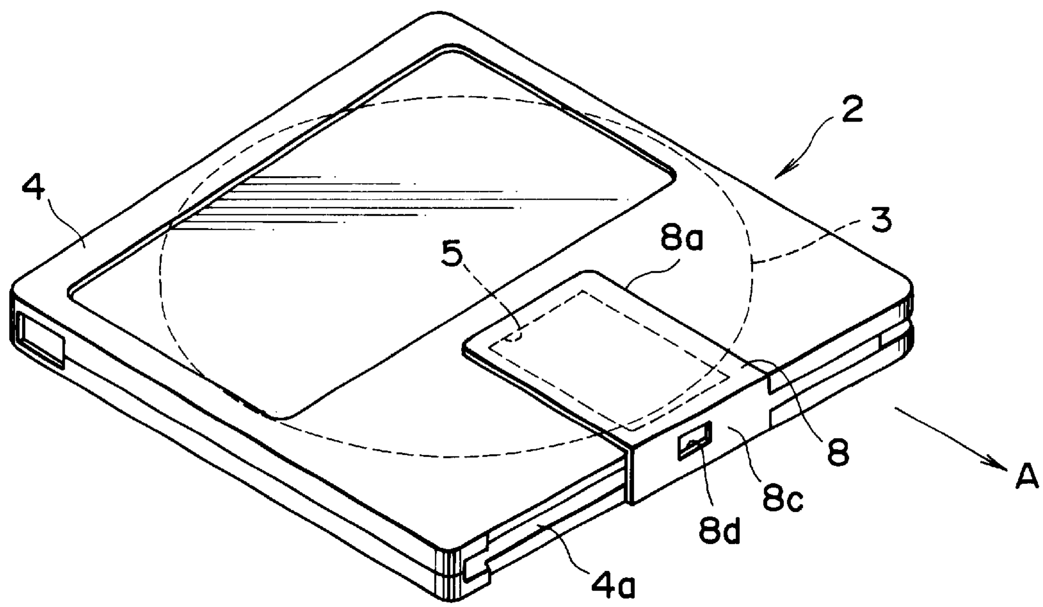
FIG. 5 is a perspective view for showing from above a recording and reproducing disk cartridge used in the recording and reproducing apparatus.
Figure 6:
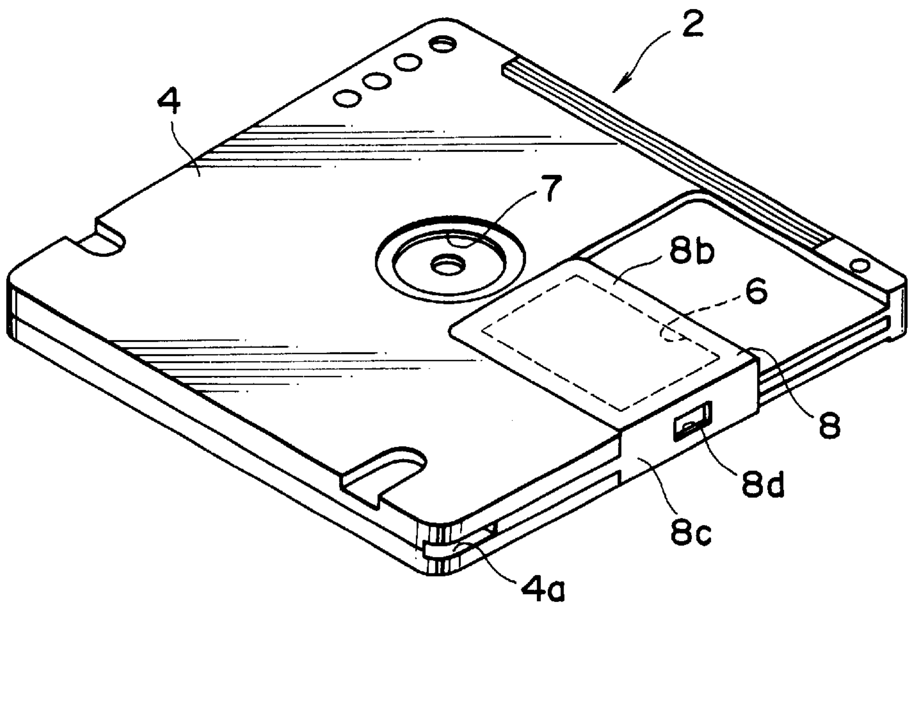
FIG. 6 is a perspective view for showing from below a recording and reproducing disk cartridge used in the recording and reproducing apparatus.

As shown in FIGS. 5 and 6, the magneto-optic disk 3 and the optical disk are rotatably stored in a cartridge main body 4 of the disk cartridge 2. The magneto-optic disk 3 is stored in it. The cartridge main body 4 is formed into a thin casing member having a rectangular main plane in which a length of one side is substantially corresponded to a diameter of the magneto-optic disk 3. As shown in FIG. 5, this cartridge main body 4 is made such that an opening 5 for the magnetic head is formed at the main plane of the upper surface side to cause a part of the signal recording surface of the magneto-optic disk 3 to be faced outwardly. As shown in FIG. 6, the cartridge main body 4 is made such that an opening 6 for the optical pick-up is formed at a position opposing against the opening 5 for the magnetic head at the main plane section of the lower plane side and then a substantial central part of the main plane part at the lower plane side is formed with an opening 7 for a chucking operation. This disk cartridge 2 for a recording and reproducing operation is inserted into the recording and reproducing apparatus 1 from a forward direction as indicated by an arrow A in FIG. 5 and loaded at a predetermined position within the apparatus 1.

The opening 5 for the magnetic head and the opening 6 for the optical pick-up of the cartridge main body 4 the recording and reproducing disk cartridge 2 are opened or closed by a shutter member 8. This shutter member 8 is made such that the shutter plates 8*a*, 8*b* opposing against each of the openings 5 and 6 and oppositely facing against to each other in parallel and a connecting section 8*c* connecting between side edges of these shutter plates 8*a*, 8*b* are integrally formed by synthetic resin material or metallic material. This shutter member 8 is made such that the connecting section 8*c* is slidably supported at a supporting groove 4*a* formed at one side of the cartridge main body 4. That is, the shutter member 8 is slid along one side of the cartridge main body 4 in a direction crossing at a right angle with the direction of arrow A in FIG. 5, thereby the openings 5 and 6 are released, and in turn it is slid in a direction crossing at a right angle with the direction of arrow A in FIG. 5 opposite to that of releasing operation, thereby it is returned back to the initial position and each of the openings 5 and 6 is closed by each of the shutter plates 8*a*, 8*b*.

The optical disk is rotatably stored from the cartridge main body 4 in the cartridge main body not shown where the opening 5 for the magnetic head is not provided, resulting in that a cartridge for exclusively used for reproducing operation.

An outer casing 10 of the recording and reproducing apparatus 1 is comprised of a lower case 11, an upper case 12 and an upper cover 13 as shown in FIG. 4.

The lower case 11 shows a lateral extending shallow container, wherein a right end of a rear wall 11*a* is cut. Its front surface of a front surface wall 11*a* is applied as an operating section provided with a plurality of operating buttons. The operating section is provided with a plurality of aforesaid operating buttons for use in operating switches for changing-over an operation of the recording and reproducing apparatus 1 and with a connector connection part 14 to which a head-phone plug not shown is connected. Other surfaces of the lower case 11 are provided with an input/output jack and a power supply jack or the like.

The upper case 12 is arranged to cover an upper opening at a right end of the lower case 11, wherein it has a top plate, side walls and a front wall, and its rear end is released. At the top plate 12*a* of the upper case 12 are arranged a plurality of operating buttons 15.

The upper cover 13 is arranged to open or close the upper surface openings at the lower case 11 except a right end covered by the upper case 12. A liquid crystal display 16 is arranged at the upper surface of the upper cover 13.

The lower case 11, the upper case 12 and the upper cover 13 are fixed to the main frame 20. The main frame 20 is formed by a metallic plate material to have a rectangular shape as viewed in a top plan view, wherein the lower case 11 is fixed to the main frame 20 to cover it from its lower side and then the upper case 12 is fixed to the right side surface of the main frame 20 so as to be continuous with it.

The upper cover 13 is rotatably supported at its front end in such a way that the rear end of the upper cover 13 may be moved up and down at the rear end of the main frame 20.

The rear end of the supporting arm 21 is rotatably supported at the rear end left side surface of the main frame 20. The upper cover 13 is fixed to the left side surface of the supporting arm 21 by a screw setting or the like while an inner surface of the left side wall is being contacted with it. A pin not shown which is projected out of the outer surface of rear end part of the right side surface of the upper cover 13 is rotatably fitted to a supporting hole not shown which is formed at the left side surface of the rear end of the upper case 12. In this way, the upper cover 13 is rotatably arranged to open or close the upper surface except the right end of the lower case 11.

A mechanical chassis 30 is supported at the main frame 20 through a damper member not shown.

Figure 11:
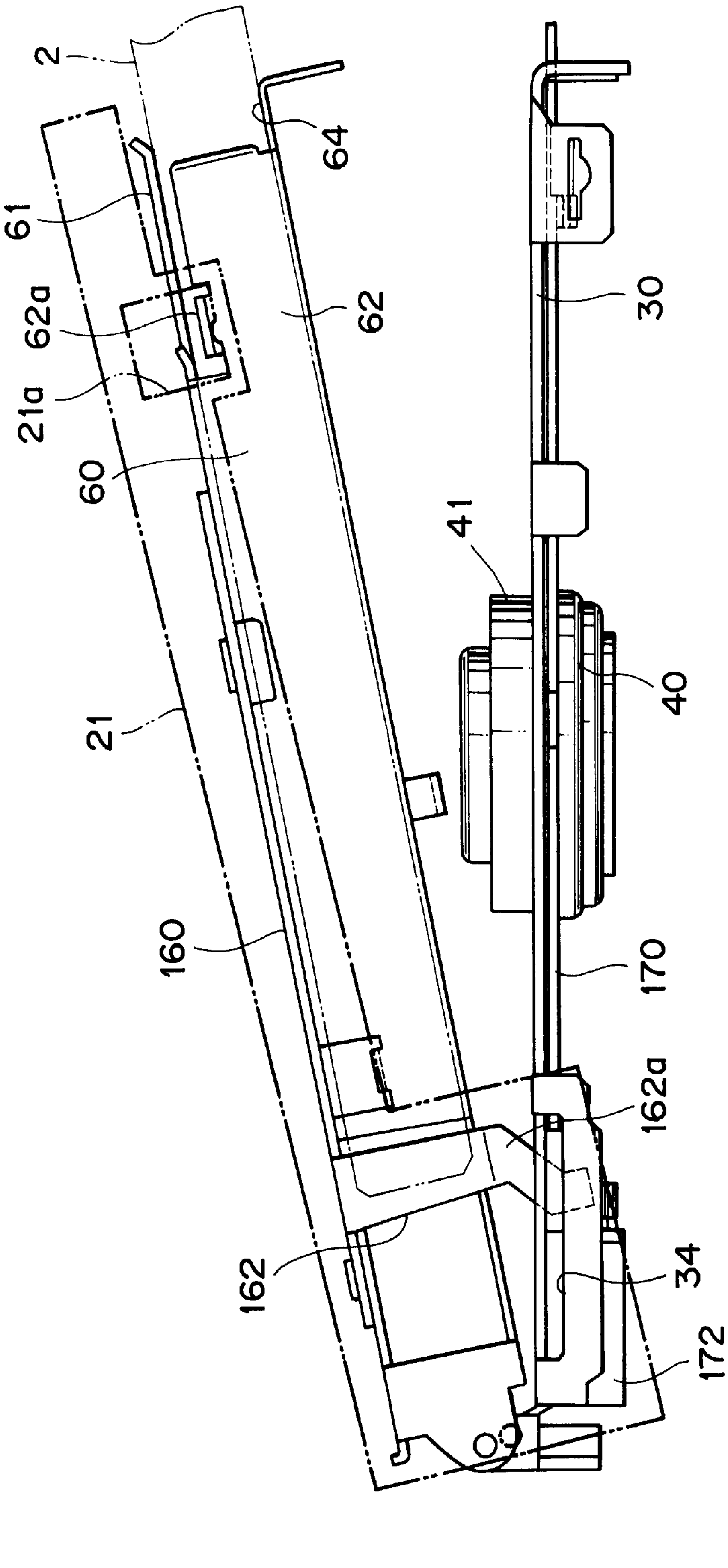
FIG. 11 is a schematic left side elevational view for showing an ejecting state at a mechanical chassis and a cartridge holder.
Figure 13:
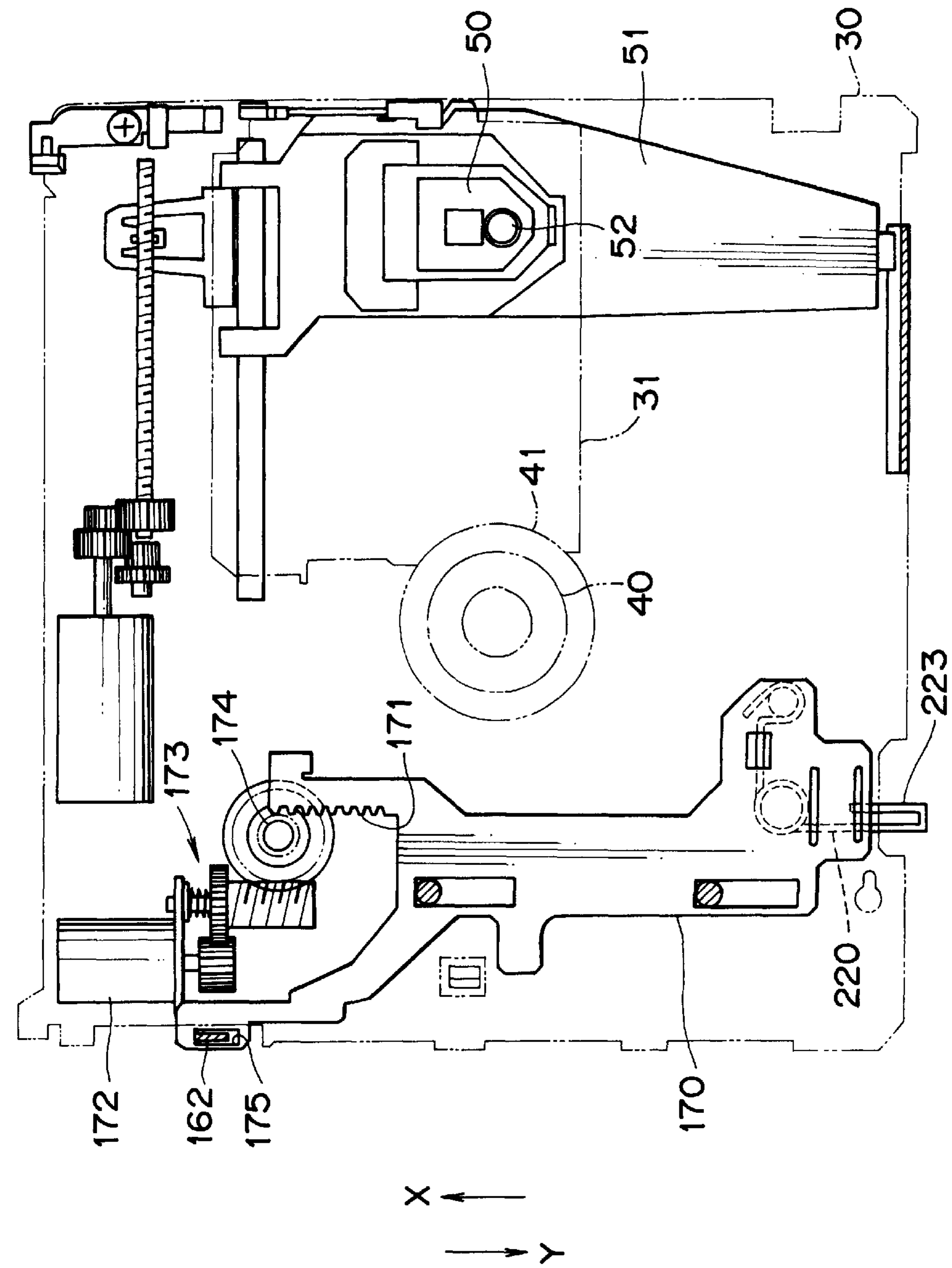
FIG. 13 is a schematic top plan view for showing a magnetic head ascending or descending slider and an optical pick-up in a stopped state of the recording and reproducing apparatus.

As shown in FIG. 11, a spindle motor 40 is arranged at the central part of the mechanical chassis 30 and a turn table 41 is integrally arranged at the rotor of the spindle motor 40. As shown in FIG. 13, an optical pick-up 50 is movably arranged at a right side part from the portion where the spindle motor 40 is arranged in the lower surface of the mechanical chassis 30 in such a way that it may be moved in a direction moving to or away from the spindle motor 40, i.e. in a radial direction of the magneto-optic disk 3 or the optical disk.

The optical pick-up 50 has an optical block not shown on a carriage 51 which is movably supported at the mechanical chassis 30 through a guide member not shown. This optical block has a laser diode acting as a light source, a light receiving element such as a photo-transistor, an optical device for guiding a laser light generated from the laser diode and an objective lens 52 for collecting laser light at a signal recording layer of the magneto-optic disk 3 or the optical disk. This optical pick-up 50 can collect the laser light from the laser diode to the signal recording layer of the magneto-optic disk 3 or the optical disk through the objective lens 52, detect the reflected light flux reflected at the signal recording layer of the magneto-optic disk 3 or the optical disk with the light receiving element and further detect an optical amount of the reflected optical flux reflected by the signal recording layer and a rotating angle of an optical deflecting direction.

Figure 14:
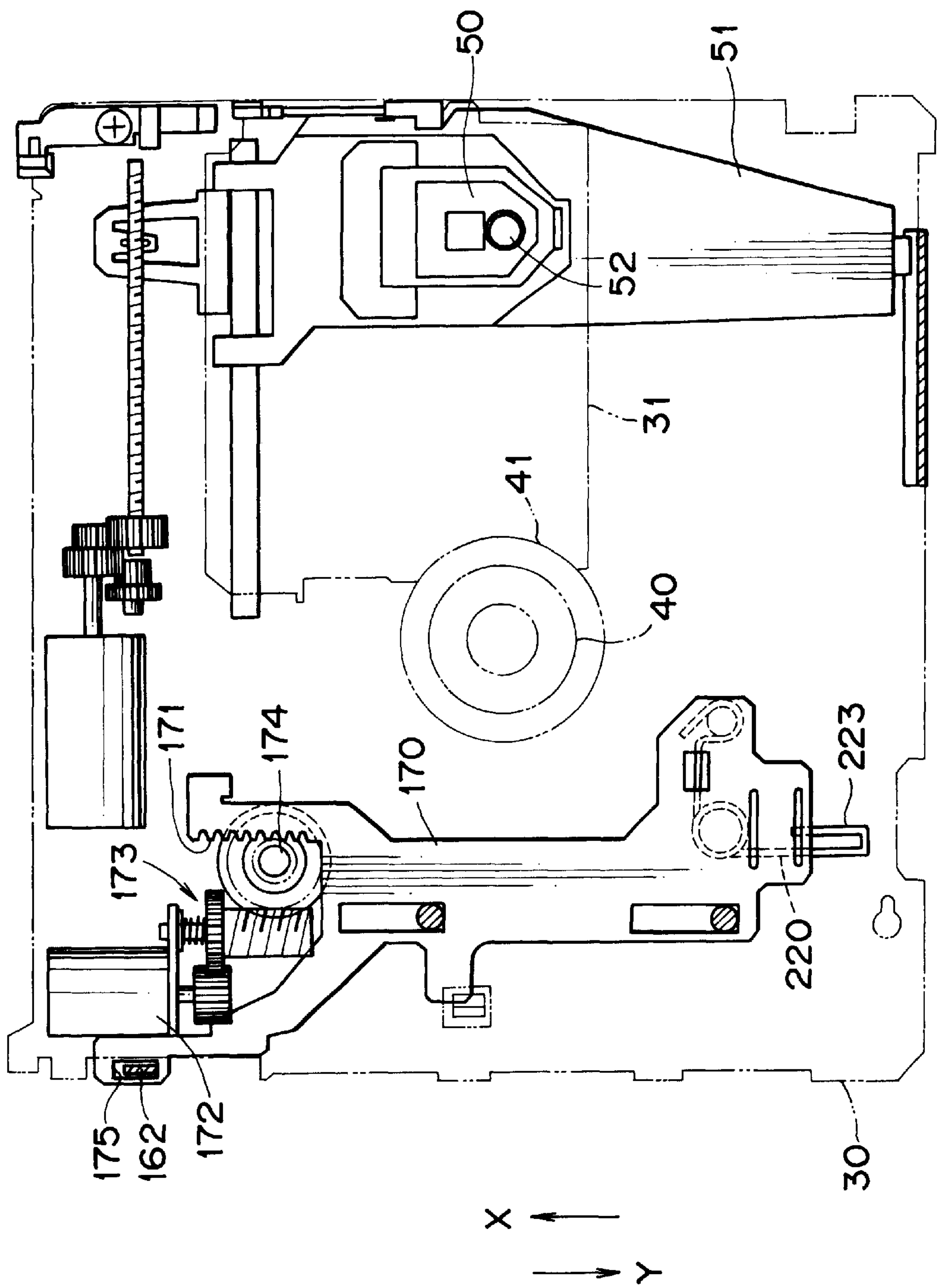
FIG. 14 is a schematic top plan view for showing a magnetic head ascending or descending slider and an optical pick-up in a recording state of the recording and reproducing apparatus.

As shown in FIG. 13 or FIG. 14, the objective lens 52 is placed near an upper part of the mechanical chassis 30 through a large opening 31 formed at the right side portion from the portion in the mechanical chassis 30 where the spindle motor 40 is arranged and then it is oppositely faced against the signal recording layer in the magneto-optic disk 3 or the optical disk held on the turn table 41. As the optical pick-up 50 is moved, the objective lens 52 is also moved in a radial direction of the magneto-optic disk 3 or the optical disk.

Figure 7:
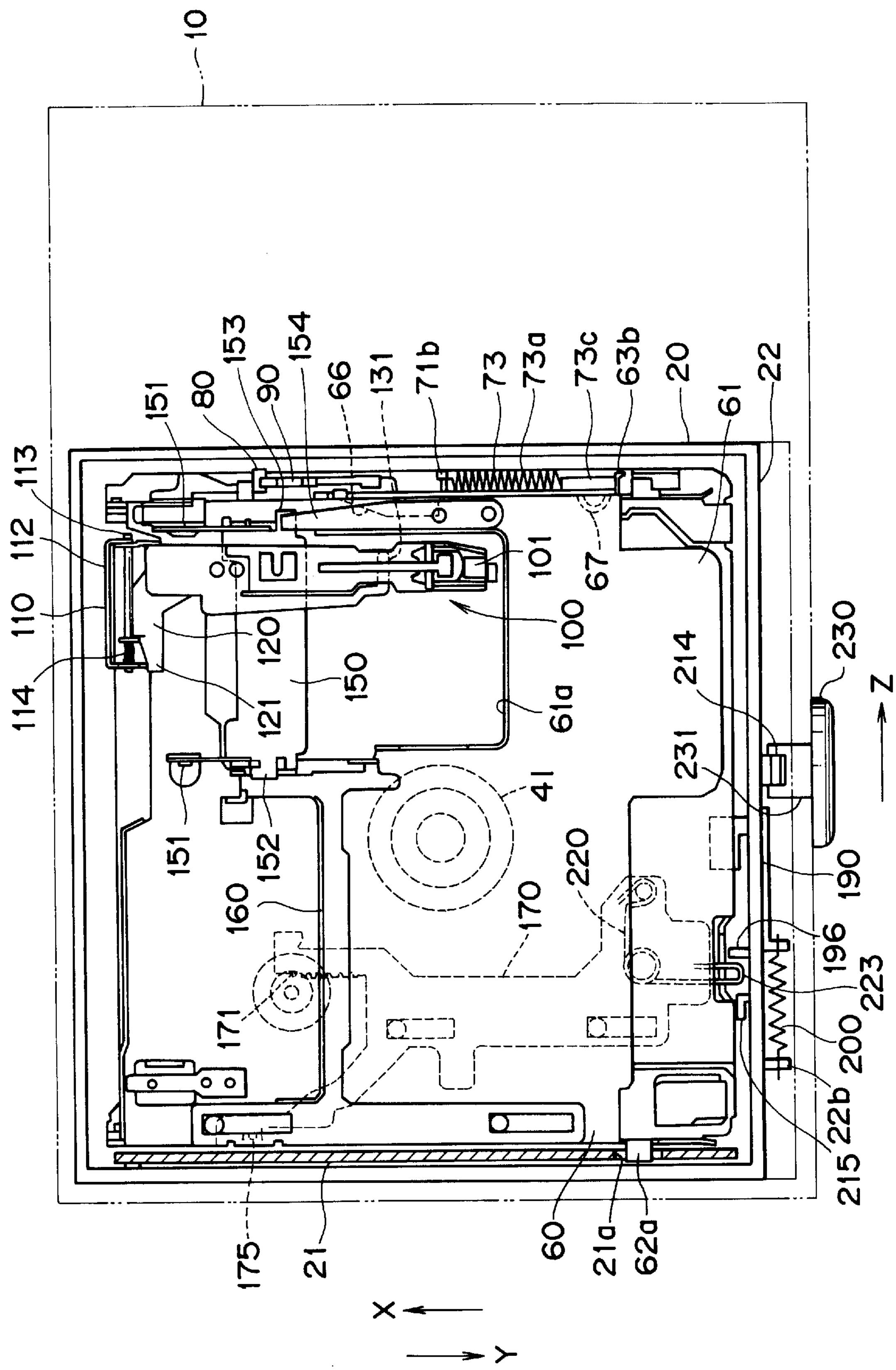
FIG. 7 is a schematic top plan view for showing a state in which a recording and reproducing apparatus at a mechanical chassis and a cartridge holder is stopped in operation.
Figure 9:
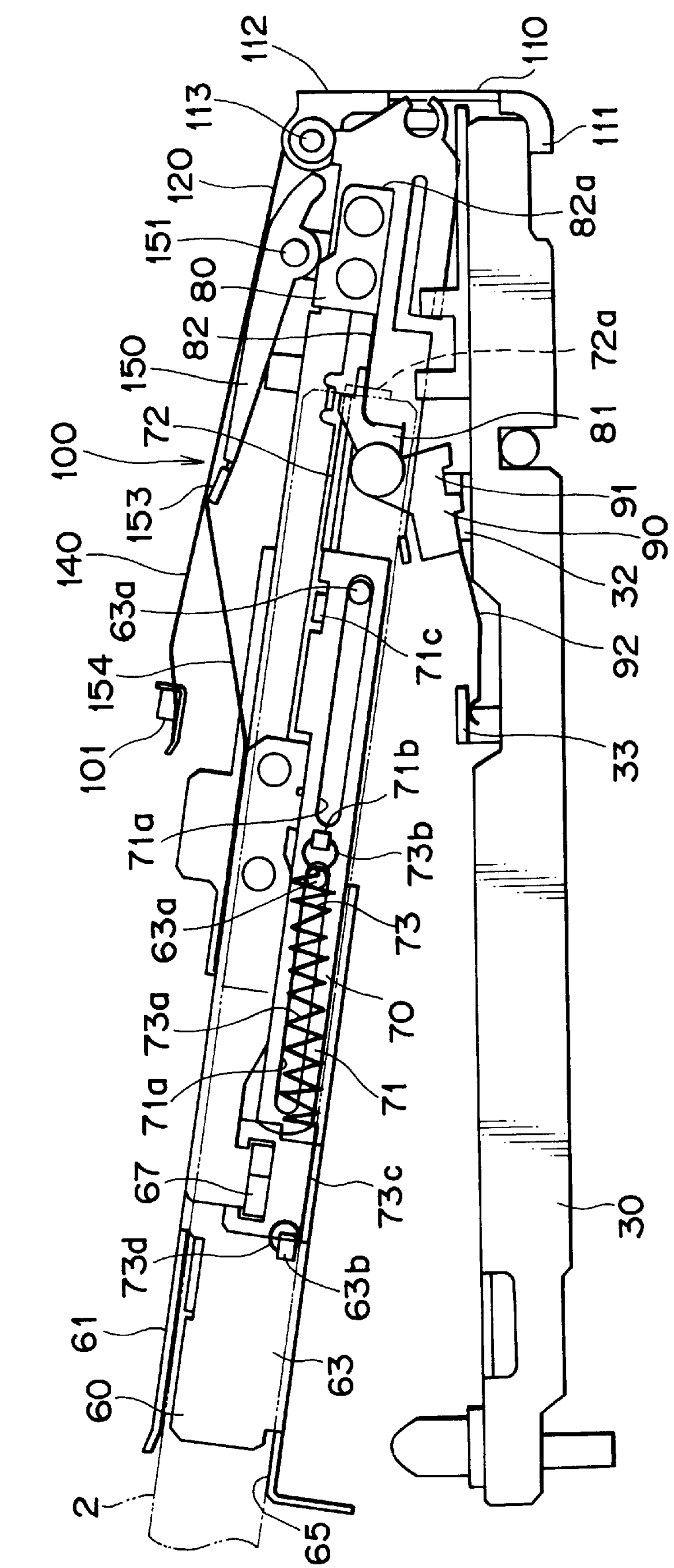
FIG. 9 is a schematic right side elevational view for showing an ejecting state at a mechanical chassis and a cartridge holder.

As shown in FIG. 9, a cartridge holder 60 is arranged at the upper surface of the mechanical chassis 30. As shown in FIGS. 7, 9 and 11, this cartridge holder 60 is comprised of a top plate 61, right and left side walls 62, 63 suspended downwardly from both side edges of the top plate 61, and supporting pieces 64, 65 projected inwardly from the lower edges of each of these side walls 62, 63. This cartridge holder 60 is formed such that a metallic plate material is bent to cause each of the aforesaid portions to be integrally formed. As shown in FIGS. 9 and 11, the disk cartridge 2 is inserted between each of the aforesaid walls 62, 63 at the lower side of the top plate 61 from the front side at the cartridge holder 60, and both side portions at a main plane part of the lower side are supported and held by each of the supporting pieces 64, 65. At this time, a substantial entire main plane at the lower side of the disk cartridge 2 is placed at the lower side and then the opening 7 for a chucking operation and the opening 6 for the optical pick-up are placed below the cartridge holder 60.

Figure 8:
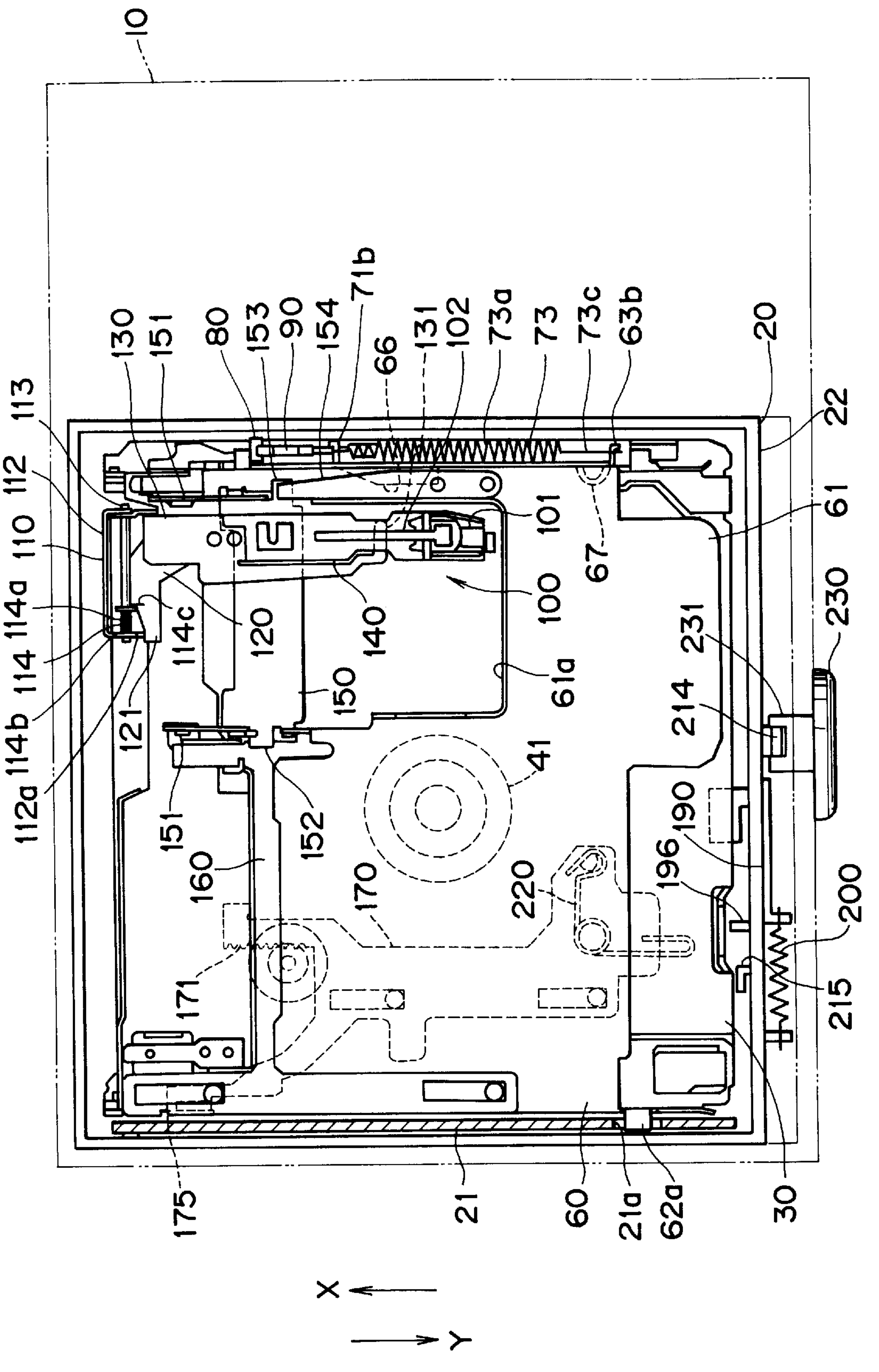
FIG. 8 is a schematic top plan view for showing a state in which a recording and reproducing apparatus at a mechanical chassis and a cartridge holder is stopped in operation.

As shown in FIG. 7, at a substantial intermediate part of the right sidewall 63 of this cartridge holder 60, a shutter releasing piece 66 is projected inwardly. When the disk cartridge 2 is inserted into the cartridge holder 60, the shutter releasing piece 66 is abutted against the front end of the connecting part 8*c* of the shutter member 8, and when the disk cartridge 2 is stored in the cartridge holder 60, the openings 5, 6 open the lid by the shutter member 8. As shown in FIGS. 7 and 8, a shutter lid closing spring 67 is arranged at a portion near the front end of the right side wall 63 in such a way as it may be bulged out inwardly. When the disk cartridge 2 is inserted into the cartridge holder 60, this shutter lid closing spring 67 is engaged with a shutter lid closing hole 8*d* formed at the connecting part 8*c* of the shutter member 8, and in turn when the disk cartridge 2 is pulled out of the cartridge holder 60, the openings 5, 6 are closed by the shutter member 8.

The cartridge holder 60 is set such that both side portions of the rear end of the holder 60 are rotatably supported at both sides of the rear end of the mechanical chassis 30. As shown in FIG. 9, under a state in which the cartridge holder 60 is rotated upwardly and spaced apart from the mechanical chassis 30, the disk cartridge 2 is inserted and after the inserted disk cartridge is held, as shown in FIG. 10, it is rotated downwardly and moved to a position near the mechanical chassis 30, resulting in that the held disk cartridge 2 is installed at a predetermined loading position by a position setting mechanism not shown.

Figure 10:
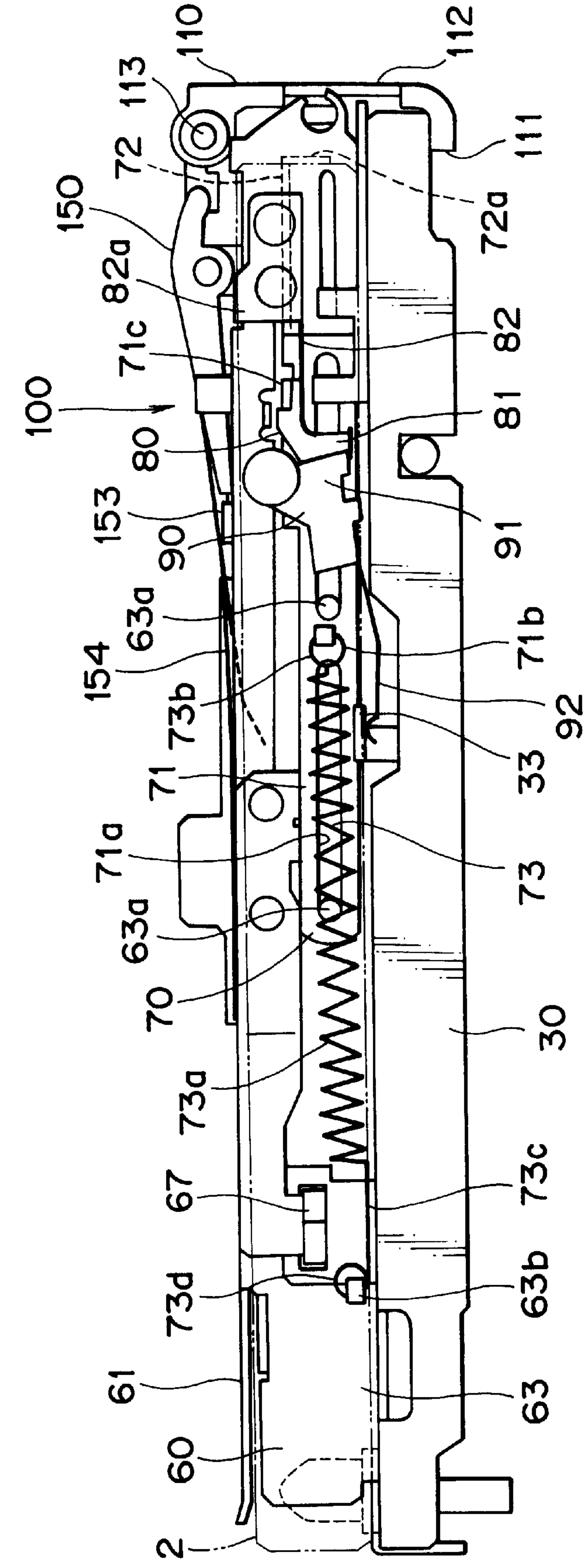
FIG. 10 is a schematic right side elevational view for showing a state in which a recording and reproducing apparatus at a mechanical chassis and a cartridge holder performs a recording operation.

As shown in FIGS. 9 and 10, the right side wall 63 of the cartridge holder 60 is provided with a release slider 70 which is slidably arranged in a direction in parallel with the side surface of the holder 60 as shown in FIG. 9. The release slider 70 is made such that a sliding supporting part 71 extending along an outer surface of the right side wall 63 and an abutting part 72 projected from the right side wall 63 into the cartridge holder 60 are integrally formed by a metallic plate material. The sliding supporting part 71 forms an elongated plate along its sliding direction, and supporting pins 63*a*, 63*a* projected at the outer surface of the right wall 63 are inserted into long holes 71*a*, 71*a* which are long along a sliding direction of the sliding supporting part 71 and spaced in a forward or rearward direction. With such an arrangement as above, the release slider 70 is movably supported in a forward or rearward direction in respect to the side wall 63. A tensile coil spring 73 is arranged in tension between a spring hook piece 71*b* projected outwardly at a substantial central part in a sliding direction of the sliding supporting part 71 and a spring hook piece 63*b* projected at an outer surface of the right side wall 63 of a position near its front end. The release slider 70 is biased forwardly by this tensile coil spring 73, i.e. in an ejecting direction of the disk cartridge 2.

The tensile coil spring 73 is made such that a coil part 73*a*, a hook part 73*b* formed at the rear end of the coil part 73*a*, a straight part 73*c* extending forwardly in a linear manner from the front end of the coil part 73*a*, and a hook part 73*d* formed at the front end of the straight part 73*c* are integrally formed. The hook part 73*b* at the rear end is engaged with the spring hook piece 71*b* of the release slider 70, and the front end hook part 73*d* is engaged with the spring hook piece 63*b* of the cartridge holder 60.

As described above, the tensile coil spring 73 is constituted by the coil part 73*a* and the straight part 73*c*, thereby a part which may be interfered with another member is made as a straight part 73*c*, it is possible to avoid its interference with another member, i.e. the shutter lid closing sprig 67 in this recording and reproducing apparatus 1. Accordingly, it is possible to arrange the tensile coil spring 73 near the right side wall 63 of the cartridge holder 60 and correspondingly to make a small-sized recording and reproducing apparatus 1.

An upper edge of the rear end part of the sliding supporting part 71 is formed with an engaging piece 71*c* projected outwardly. An abutting part 72 is bent from the upper edge of the rear end of the sliding supporting part 71 toward an inside part of the cartridge holder 60, extends from there to a rearward direction and its rear end is formed with an abutting piece 72*a* projected inwardly.

Figure 18:
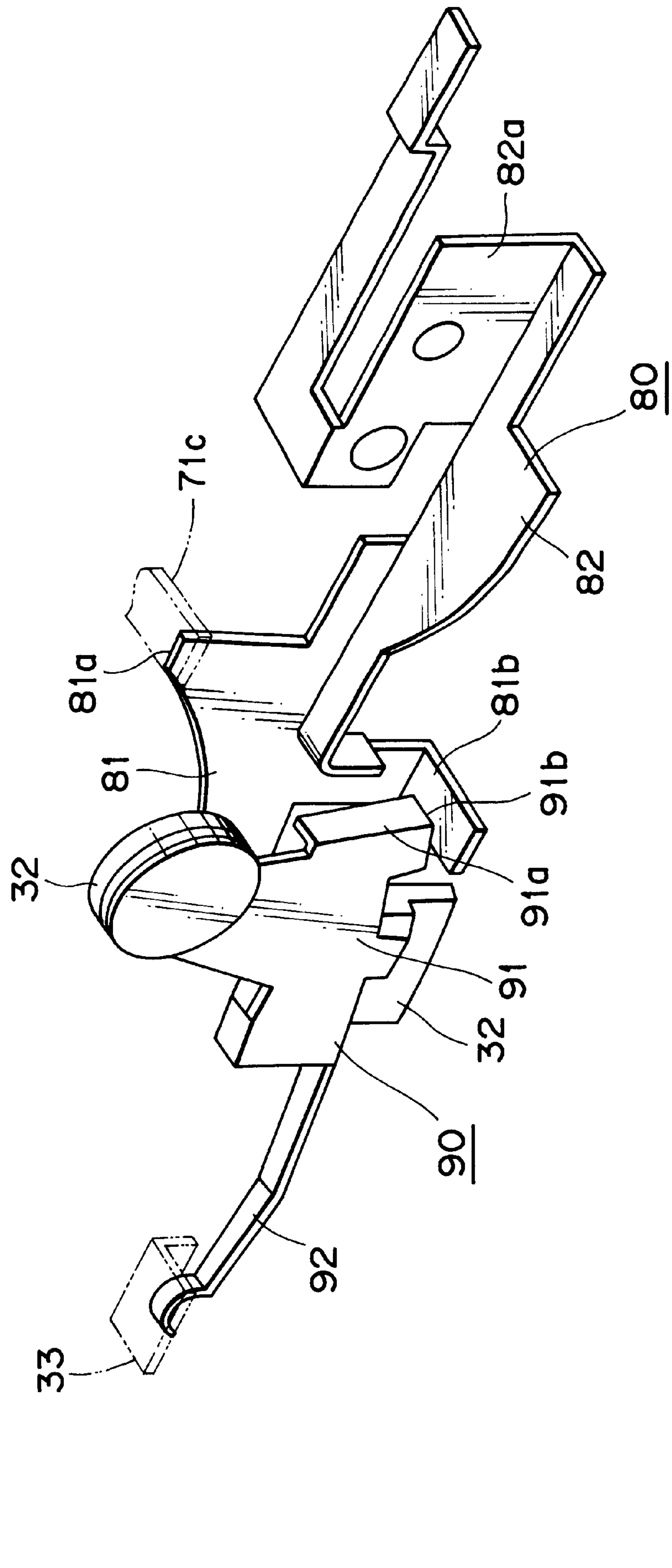
FIG. 18 is a perspective view for showing a mechanism for locking a member for ejecting a disk cartridge from a cartridge holder and a mechanism for releasing the locked state.

As shown in FIGS. 9 and 10, an outer surface at the rear end of the right side wall 63 of the cartridge holder 60 is provided with a lock member 80. As shown in FIG. 18, the lock member 80 is made such that its main part 81 and a spring part 82 are integrally formed by metallic plate material having a spring resiliency. The main part 81 has a substantial <-shape as viewed from the right side, its upper end is formed with the engaging part 81*a*, and an engaged piece 81*b* is projected outwardly at its lower end. The spring part 82 extends rearwardly from the part near the upper end of the rear end of the main part 81 with its plane being directed in a vertical direction and the end part of the spring part 82 is formed with a fixing part 82*a*. The fixing part 82*a* is fixed to an outer surface of the rear end of the right side wall 63 of the cartridge holder 60. The engaging part 81*a* of the main part 81 is positioned to traverse across a moving path of the engaging piece 71*c* of the release slider 70.

Figure 19:
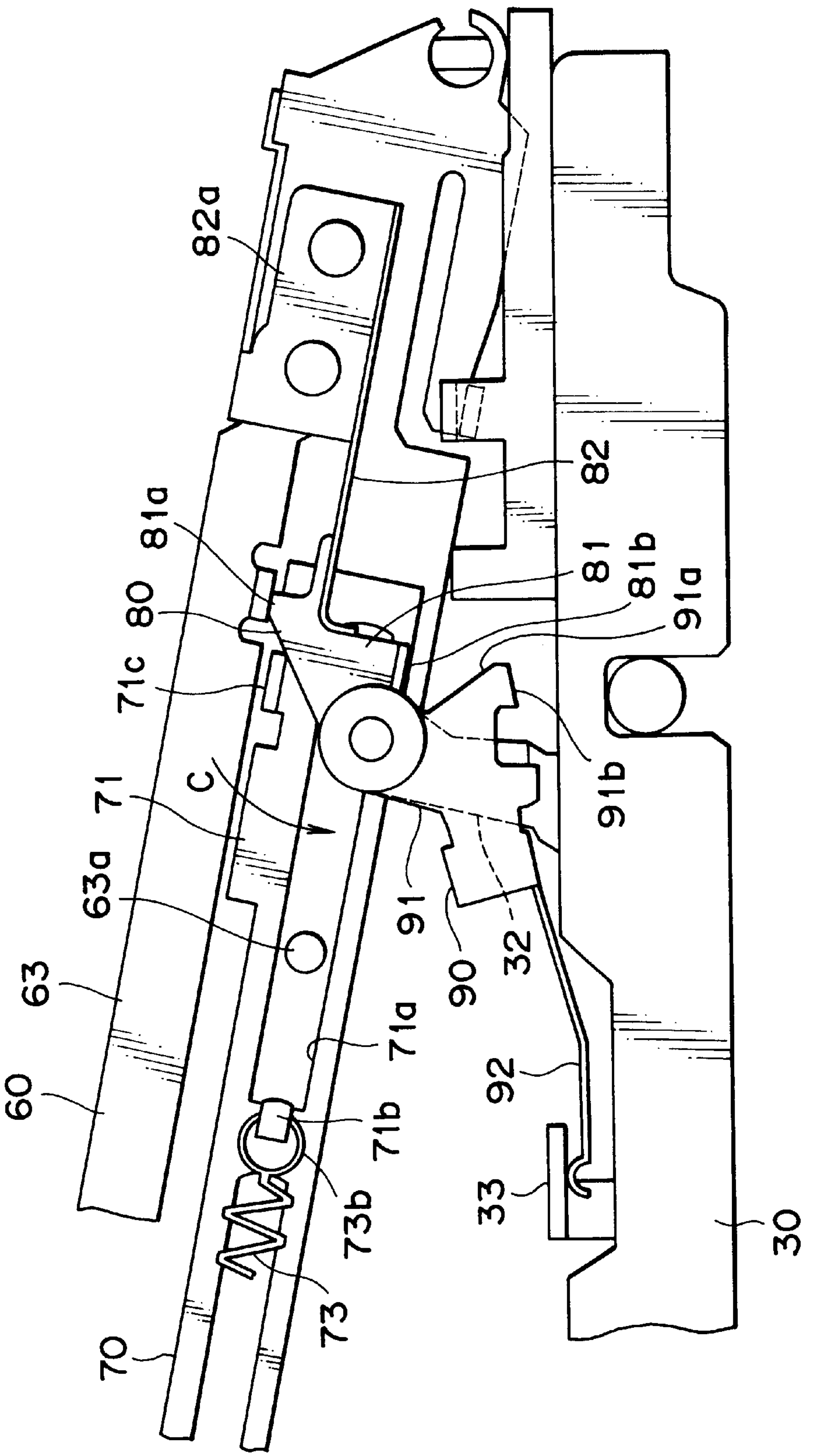
Figure 20:
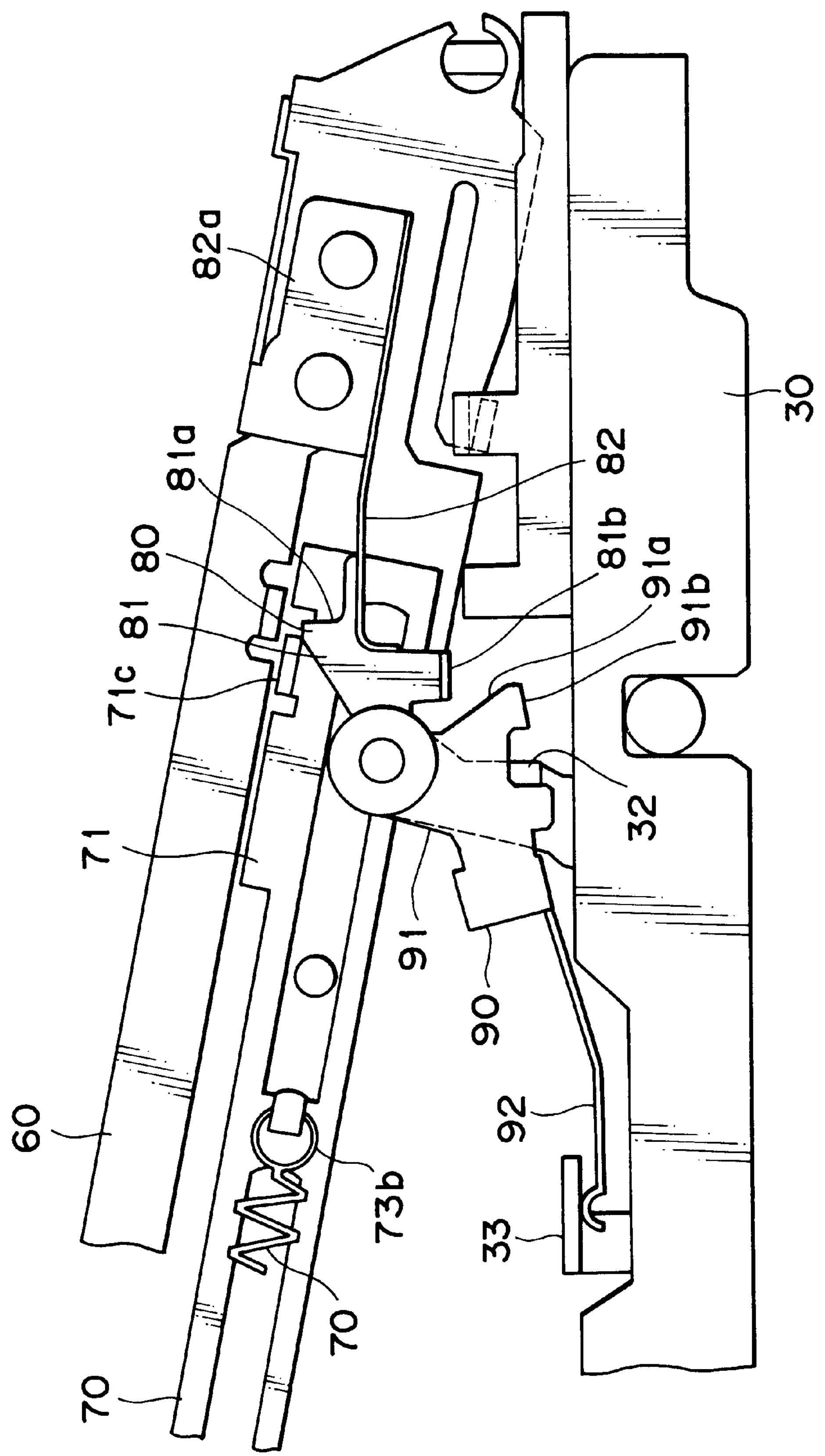
Figure 21:
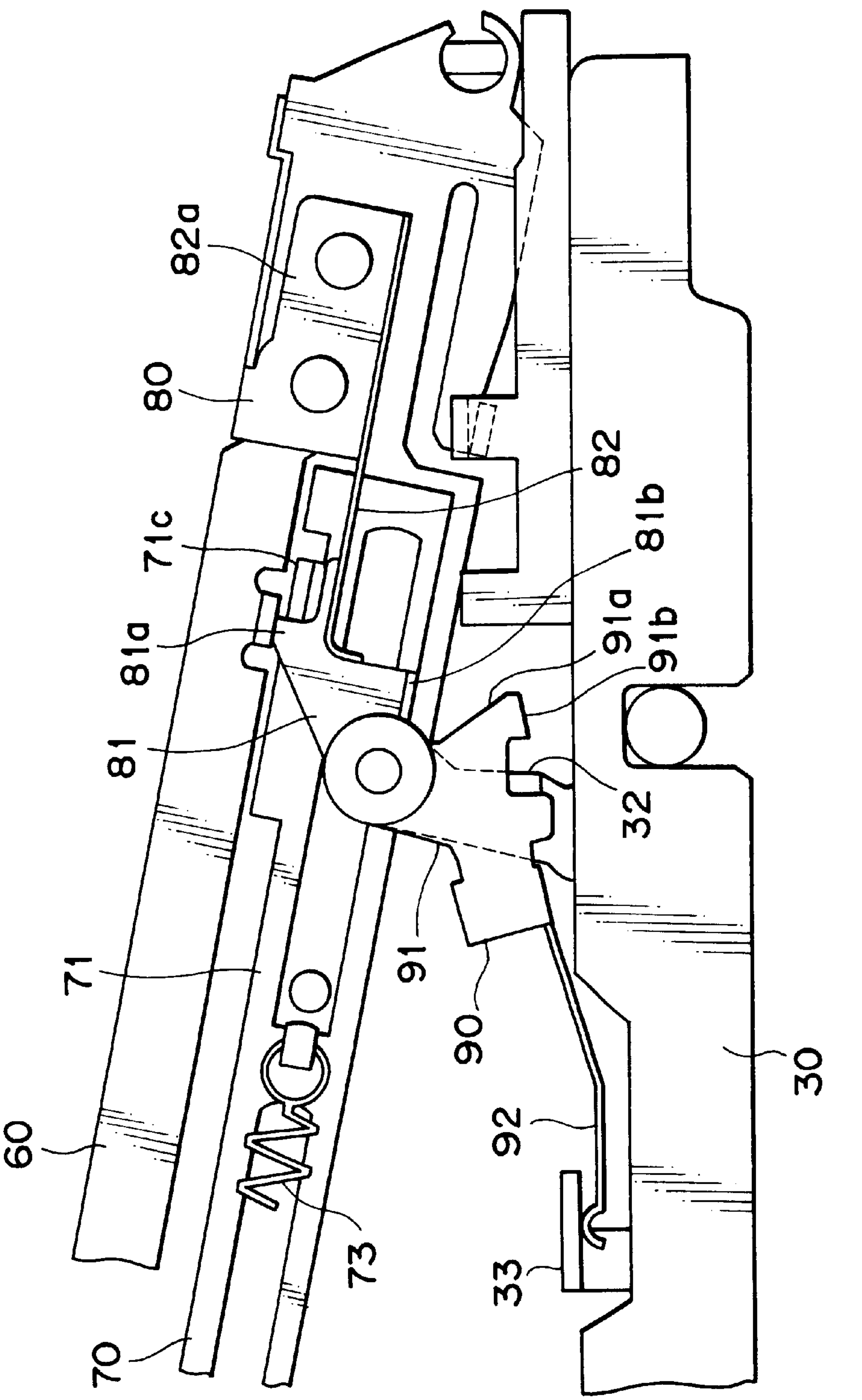

Thus, as described above, as the disk cartridge 2 is being inserted into the cartridge holder 60, the right side part of the extremity end surface of the cartridge main body 4 is abutted against the abutting piece 72*a* of the release slider 70 to cause the abutting piece 72*a* to be pushed in a rearward direction, so that the release slider 70 is moved in a rearward direction against a tension force of the tensile coil spring 73. As shown in FIGS. 19 and 20, the release slider 70 is moved in a rearward direction, the engaging piece 71*c* pushes the front edge of the engaging part 81*a* of the lock member 80, the main part 81 of the lock member 80 is moved downwardly due to flexing of the spring part 82 at the lock member 80 as shown in FIG. 20 and the engaging piece 71*c* is moved in a rearward direction of the engaging part 81*a*, i.e. in a forward part in an inserting direction of the cartridge main body 4. As the engaging piece 71*c* is passed to the rear side of the engaging part 81*a*, the flexed spring part 82 is returned back to its original state as shown in FIG. 21, the engaging part 81*a* is positioned at a front side of the engaging piece 71*c* and engaged with the engaging piece 71*c* so as to prevent the release slider 70 from being returned in a forward direction.

Figure 25:
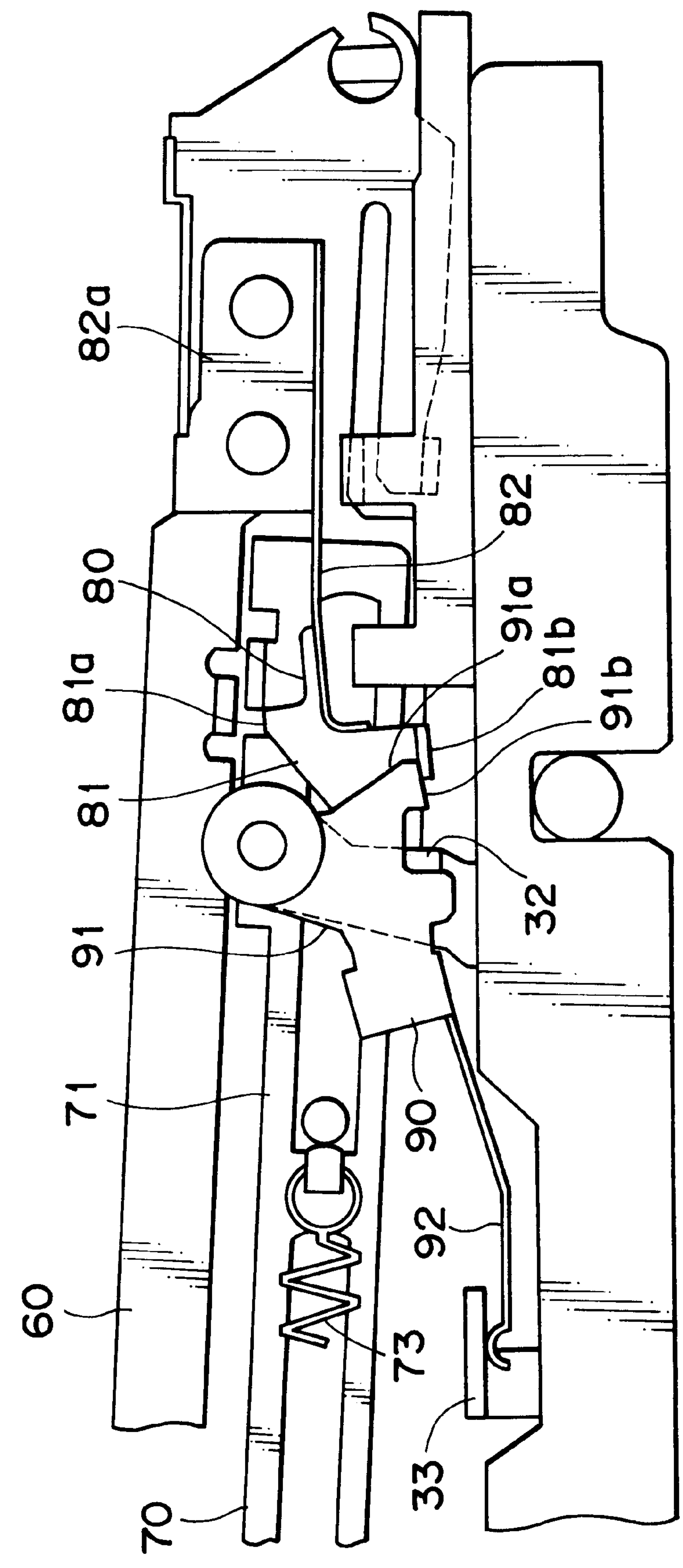

When the disk cartridge 2 is to be ejected, the lock member 80 is moved downwardly in respect to the cartridge holder 60 as shown in FIG. 25 and the engaging part 81*a* of the lock member 80 is disengaged downwardly from the moving path of the engaging piece 71*c* of the release slider 70 and the abutting piece 72*a* of the release slider 70 pushes the right side of the front end surface of the disk cartridge 2 in a forward direction. With such an arrangement as above, the disk cartridge 2 is set such that the rear end portion of the cartridge main body 4 is projected out of the front end of the cartridge holder 60.

As shown in FIG. 9, the lock releasing member 90 is rotatably supported at the position near the rear end of the right side part of the mechanical chassis 30. The lock releasing member 90 is made such that a main part 91 and a spring part 92 extending from the lower end of the front end of the main part 91 have a spring resiliency and are integrally formed by metallic plate material. The main part 91 forms a substantial triangle shape as viewed from a right side and has a rear slant edge 91*a* formed by bending the rear edge of the main part 91 in a leftward direction and an engaging edge 91*b* continuous to the lower end of the rear side slant edge 91*a* and extending in a lateral direction. The main part 91 at its upper end is rotatably supported to a supporting piece 32 vertically arranged at a position near the rear end of the right side of the mechanical chassis 30.

The spring part 92 extends from the lower part of the front end of the main part 91 in a forward direction, and the extremity end of the spring part 92 is resiliently contacted with the lower surface of the abutting piece 33 projected at a substantial intermediate position at the right side of the mechanical chassis 30.

In addition, when the lock releasing member 90 and the member 32 supporting the lock releasing member are constructed as described above, it is possible to reduce an installing space in a width direction of the apparatus 1, i.e. in a lateral direction in FIG. 7. Then, as the installing space is reduced, an installing space for the tensile coil spring 73 for biasing the moving force of the release slider 70 is also reduced, so that it is necessary to reduce an outer diameter of the coil at the coil part 73*a* of the tensile coil spring 73. Reduction in an amount of force caused by reducing an outer diameter of the coil part 73*a* may be accommodated by increasing the number of turns in a coil of the coil part 73*a*.

Figure 22:
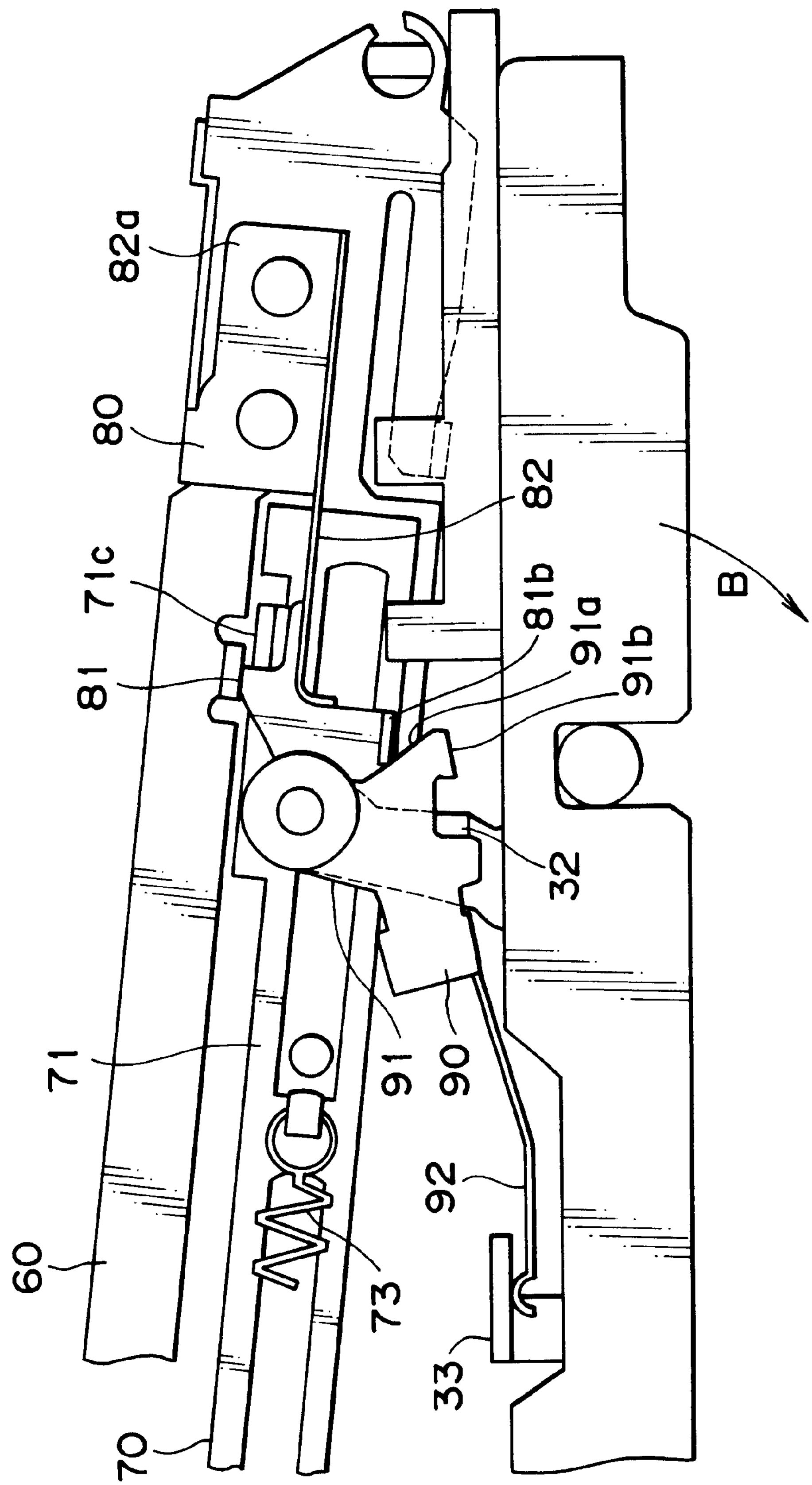
Figure 23:
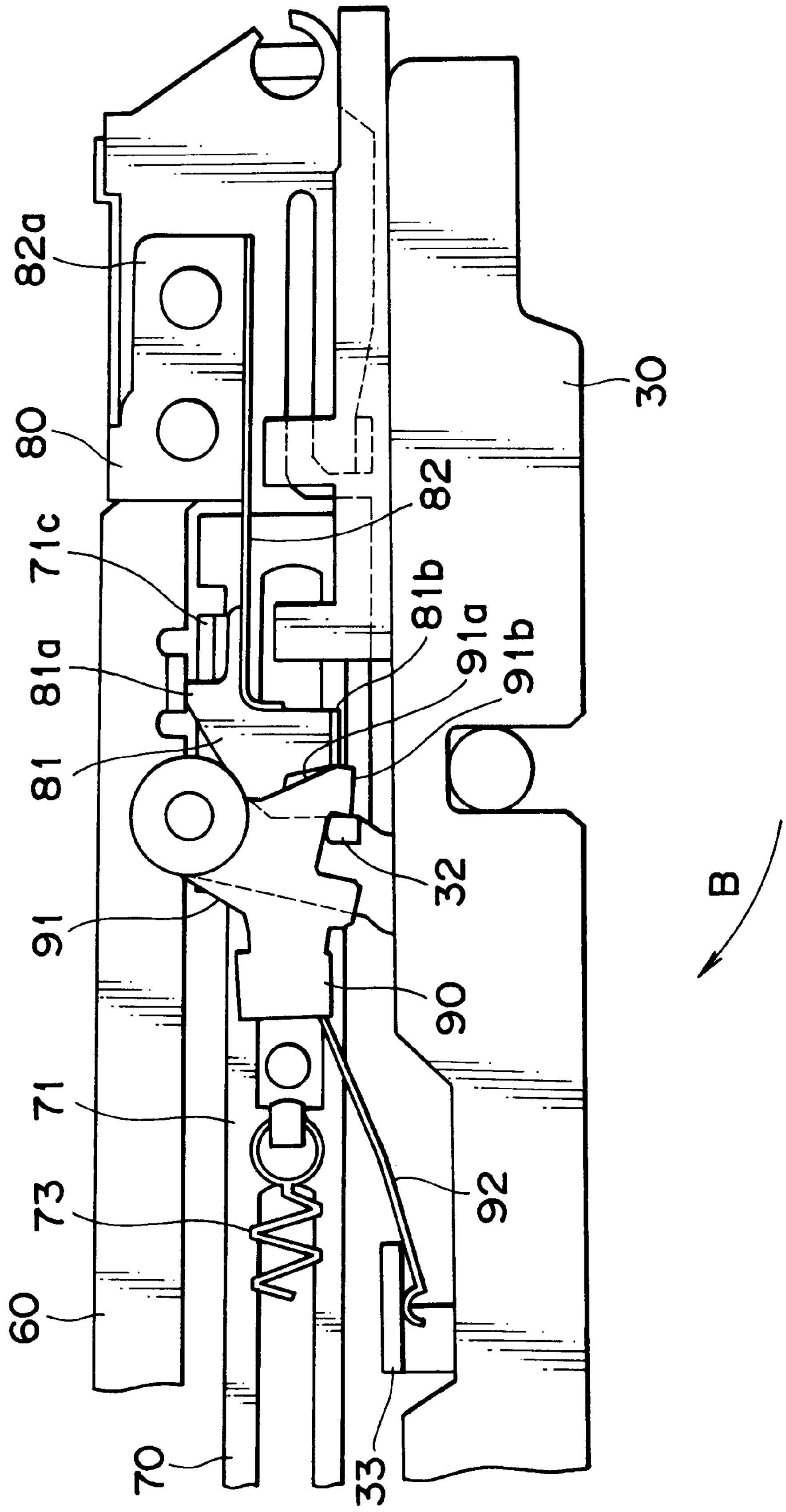
Figure 24:
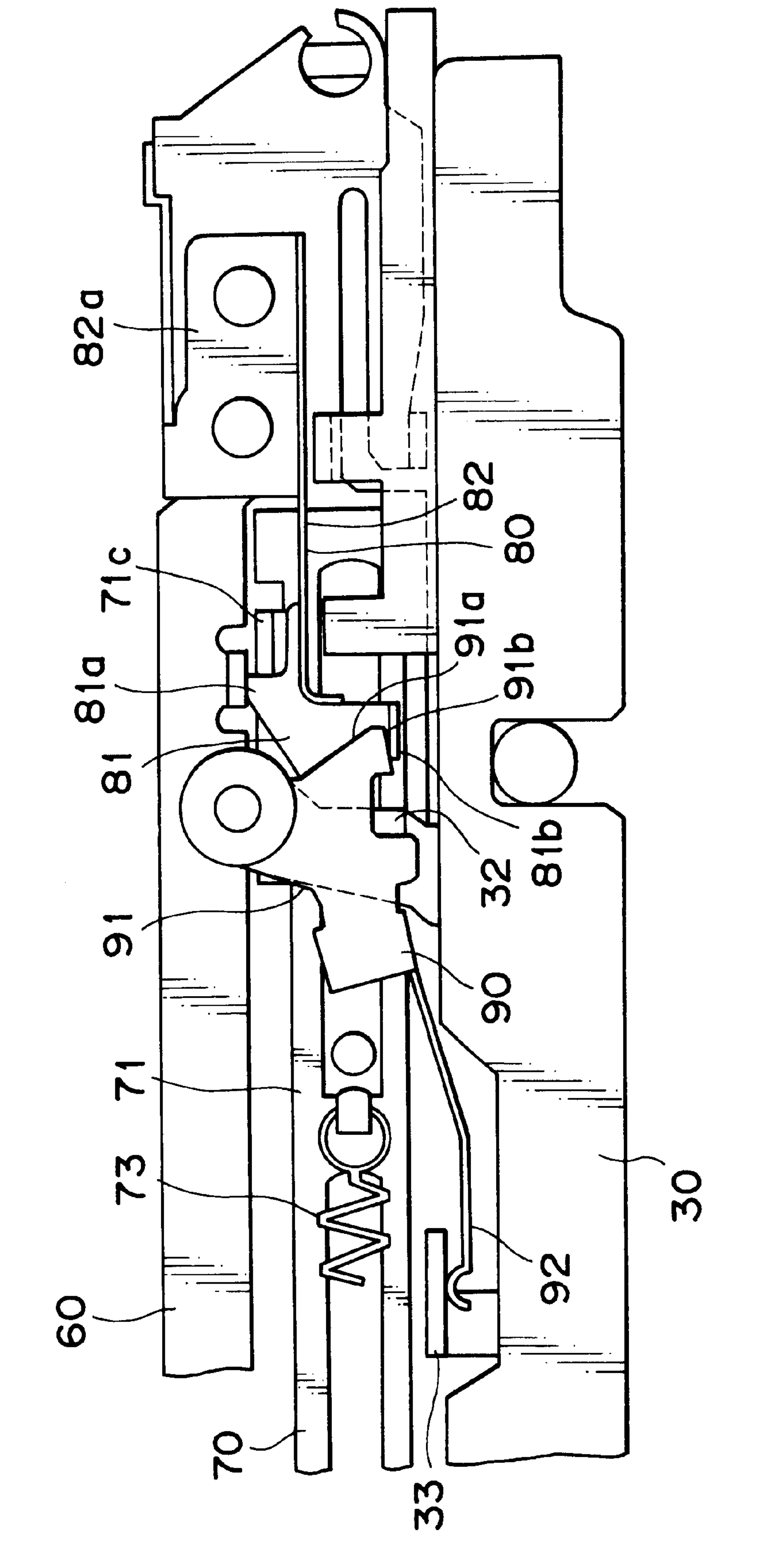

As the cartridge holder 60 is rotated in a downward direction with the disk cartridge 2 being fed into the cartridge holder, the engaged piece 81*b* of the lock member 80 is slid downwardly while it pushes a slant edge 91*a* at the rear side of the lock releasing member 90 as shown in FIGS. 22 and 23. With such an arrangement as above, the main part 91 of the lock releasing member 90 is turned in a direction o an arrow B in FIGS. 22 and 23 while the spring part 92 is being curved to be projected upwardly. As the cartridge holder 60 installs the disk cartridge 2 at a predetermined loading position, the engaged piece 81*b* of the lock member 80 reaches the lower side from the lower end of the slant edge 91*a* at the rear side of the lock releasing member 90. As shown in FIG. 24, the main part 91 of the lock releasing member 90 is rotated in a direction opposite to the direction of an arrow B in FIG. 22 with a resilient force stored in the spring part 92 while being bent to be projected upwardly, resulting in that the engaging edge 91*b* of the main part 91 comes to the upper side of the engaged piece 81*b* of the lock member 80 and is engaged with the engaged piece 81*b* so as to prevent the upward rotation of the lock member 80.

Figure 26:
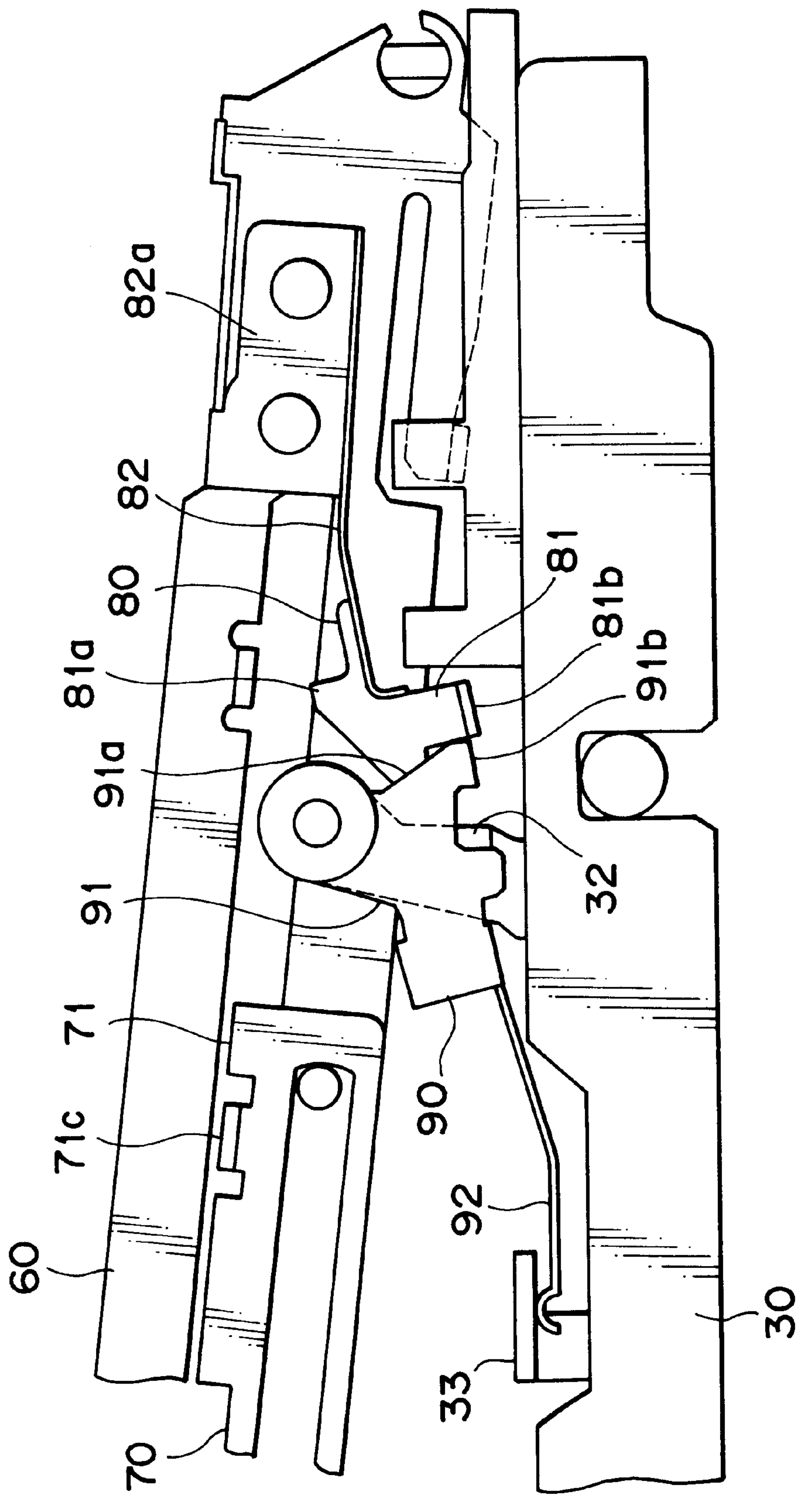
Figure 27:
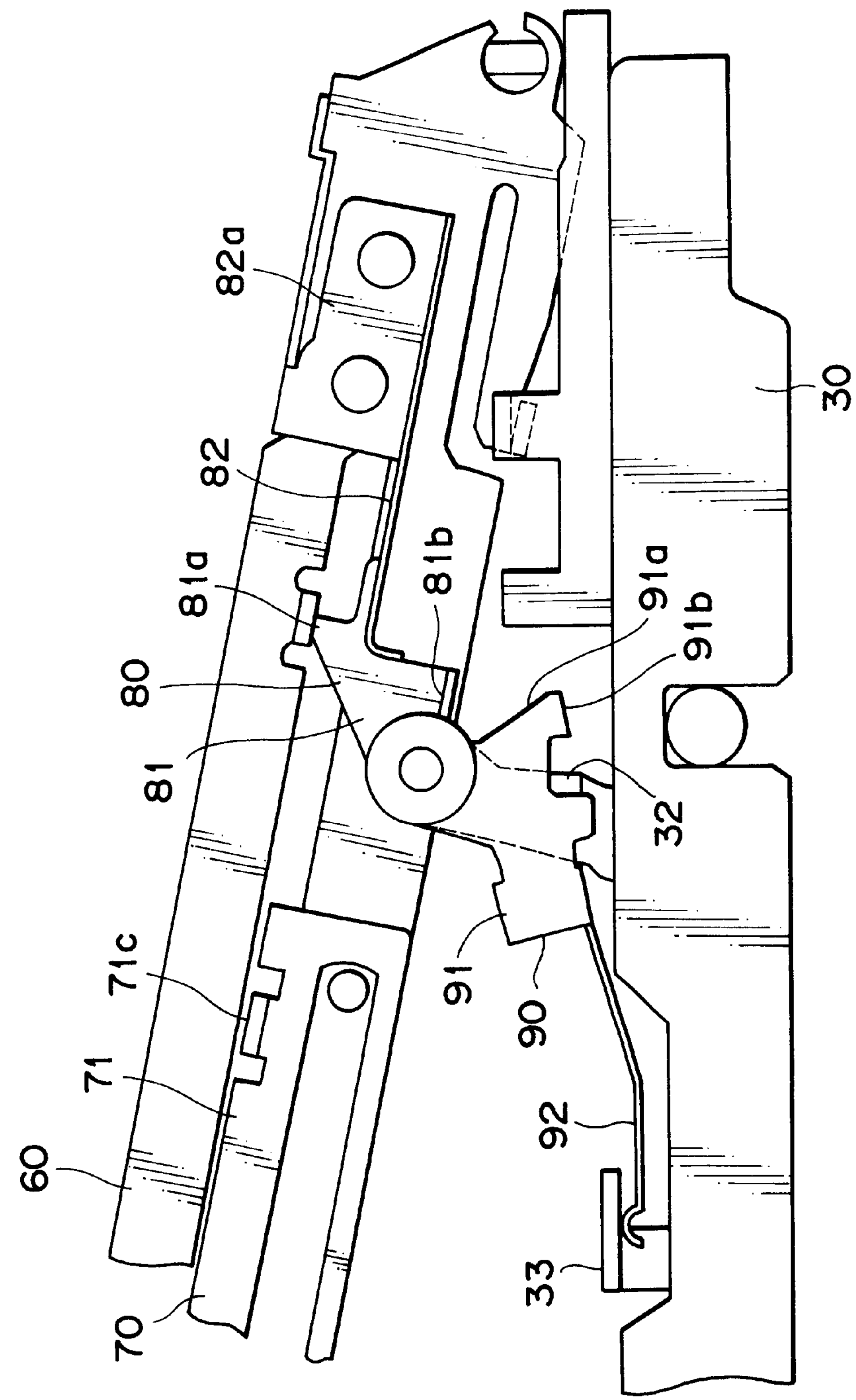

However, the engagement between the engaged piece 81*b* of the lock member 80 and the engaging edge 91*b* of the lock releasing member 90 is set such that if an upward moving force is applied with a slight stronger force to the lock member 80, the spring part 82 of the lock member 80 is flexed, thereby the main part 81 is rotated in a direction of an arrow C in FIGS. 25 and 26 while moving downwardly in respect to the cartridge holder 60, and the engaged piece 81*b* is released from the engaged state with the engaging edge 91*b* of the lock releasing member 90. Accordingly, when an ejecting operation is carried out, the cartridge holder 60 is rotated with its front end being moved upwardly, the main part 81 of the lock member 80 is rotated in a direction of arrow C in FIG. 25, the locked state to the release slider 70 is released as shown in FIG. 25, resulting in that the release slider 70 is moved forwardly by a tension force of the tensile coil spring 73 and the front end of the disk cartridge 2 is projected out of the front end of the cartridge holder 60. Subsequently, since the engaged piece 81*b* of the lock member 80 is released from the engaged state with the engaging edge 91*b* of the lock member 80, the main part 81 of the lock member 80 returns back to its original position as shown in FIG. 27 by a resilient force stored under a reflexing of the spring part 82 as shown in FIG. 27 and then the engaging part 81*a* of the lock member 80 is again positioned on a moving path of the engaging piece 71*c* of the release slider 70.

A front end of the left side wall 62 of the cartridge holder 60 is provided with a connecting piece 62*a* projected outwardly. The connecting piece 62*a* is positioned within a connecting hole 21*a* formed at the front end of the supporting arm 21. The connecting piece 62*a* is positioned within the connecting hole 21*a* with a surplus amount in a vertical direction being applied.

Figure 29:
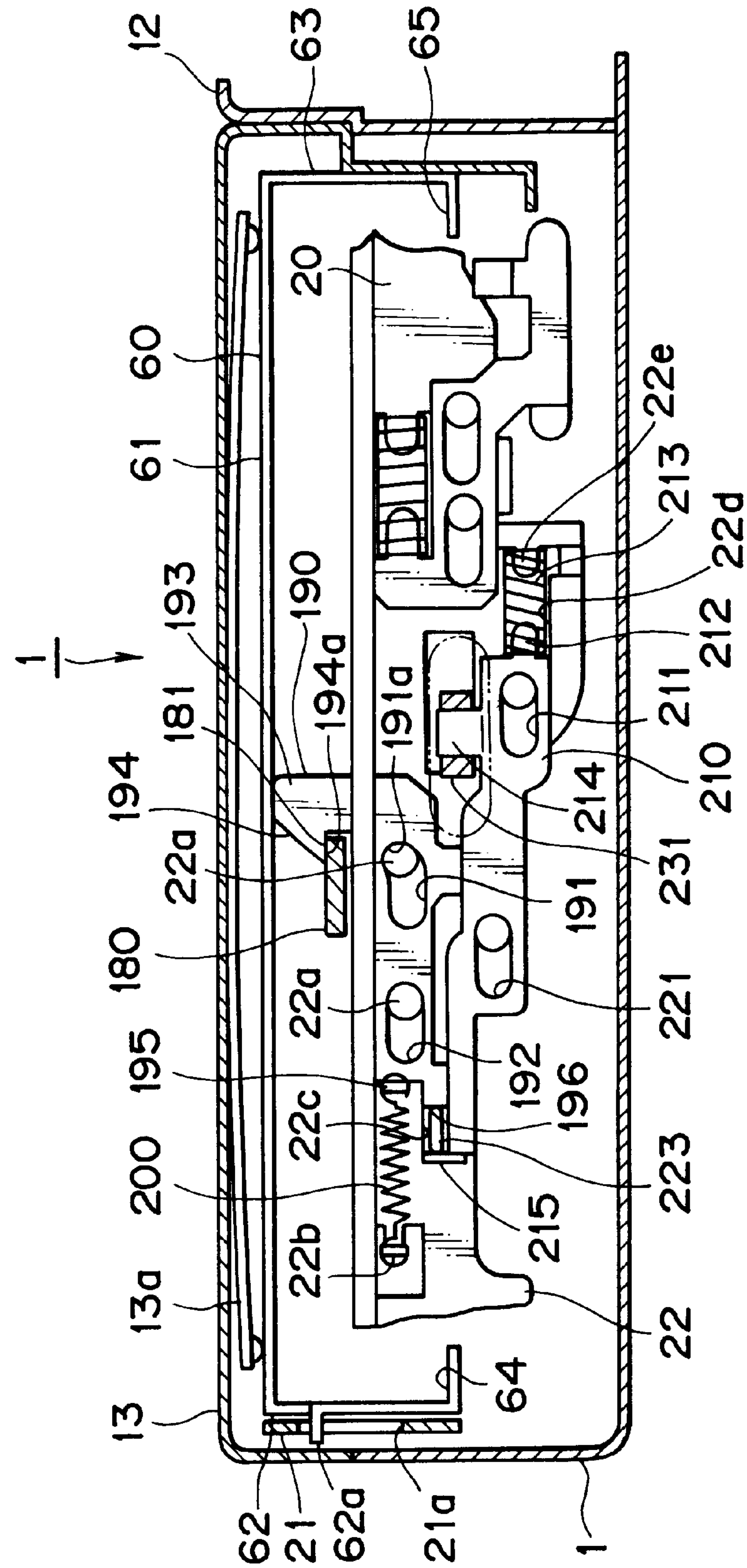
FIG. 29 is a front elevational view for showing a substantial part to illustrate a mechanism for locking an upper cover to a lid closing position.
Figure 30:
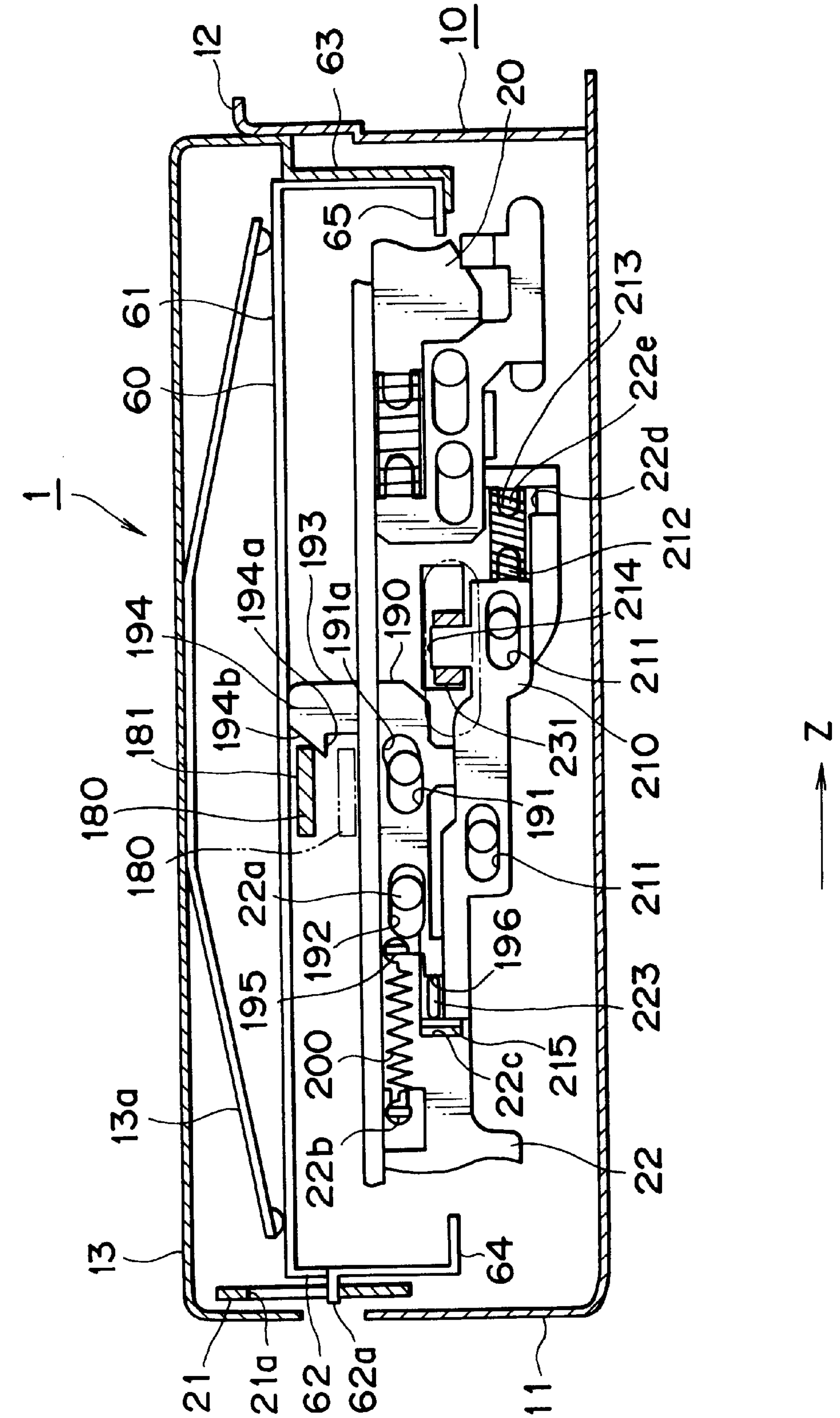
FIG. 30 is a front elevational view for showing a substantial part to illustrate a state in the midway in which an upper cover is moved to a lid closing position.
Figure 31:
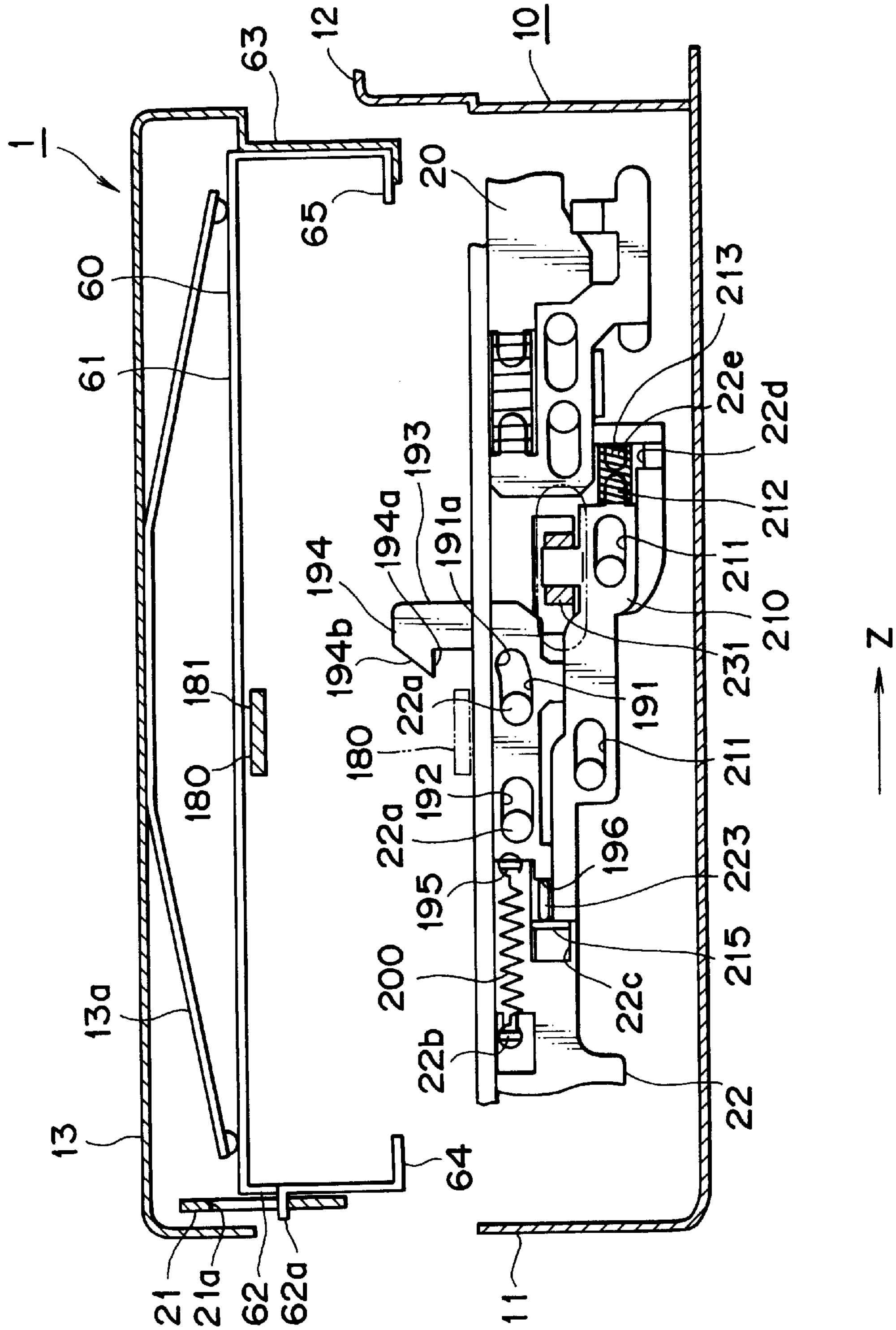
FIG. 31 is a front elevational view for showing a substantial part to illustrate a state in which a locked state for a lid closing position in respect to an upper cover is released.

As shown in FIGS. 29 to 31, a pressing spring 13*b* composed of a leaf spring material is fixed to the lower surface of the front end of the upper cover 13. The pressing spring 13*b* at its central part is fixed to the upper cover 13. The portion extending in a lateral direction from the central part of the spring 13*b* is inclined in a downward direction. As the upper cover 13 is rotated in a downward direction and closed, the cartridge holder 60 rotated together with the upper cover 13 is also rotated in a downward direction, as the upper cover 13 is locked at the lid closing position by the lock mechanism to be described later, both right and left sides of the pressing spring 13*b* are resiliently contacted with the upper surface of the top plate 61 of the cartridge holder 60 as shown in FIG. 29, and the cartridge holder 60 becomes a state in which it is pushed against the installed position on the mechanical chassis 30. At this time, the connecting piece 62*a* of the cartridge holder 60 is positioned at the upper part of the connecting hole 21*a* of the supporting arm 21.

As shown in FIG. 31, when the locked state for the lid closing position for the upper cover 13 is released, the upper cover 13 is rotated upwardly. Then, if the front end of the upper cover 13 is held with a hand to move the upper cover 13 in an upward direction, the upper cover 13 is further rotated upwardly and at this time, the lower side opening edge of the connecting hole 21*a* of the supporting arm 21 rotated together with the upper cover 13 pushes the connecting piece 62*a* of the cartridge holder 60 in an upward direction and then the cartridge holder 60 is rotated in an upward direction.

As shown in FIGS. 7 and 9, this recording and reproducing apparatus 1 is provided with a magnetic head device 100 having a magnetic head for use in generating an external magnetic field when a recording on the magneto-optic disk 3 is carried out.

The magnetic head device 100 is provided with a connecting arm 110, a magnetic head supporting plate 120 and a magnetic head supporting arm 130 or the like in addition to the magnetic head 101.

Figure 15:
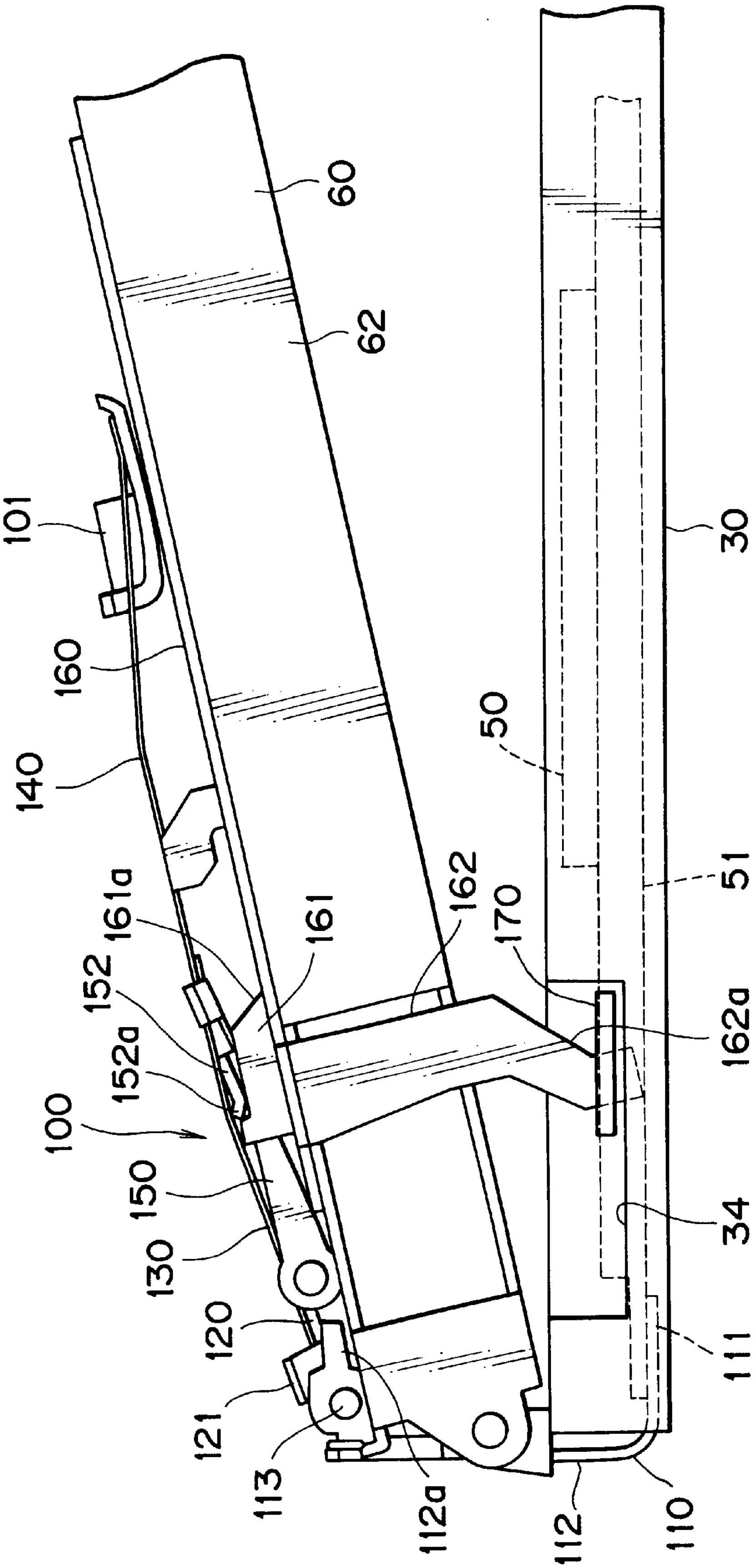
FIG. 15 is a schematic left side elevational view for showing a magnetic head ascending or descending mechanism at the time of ejecting operation.
Figure 16:
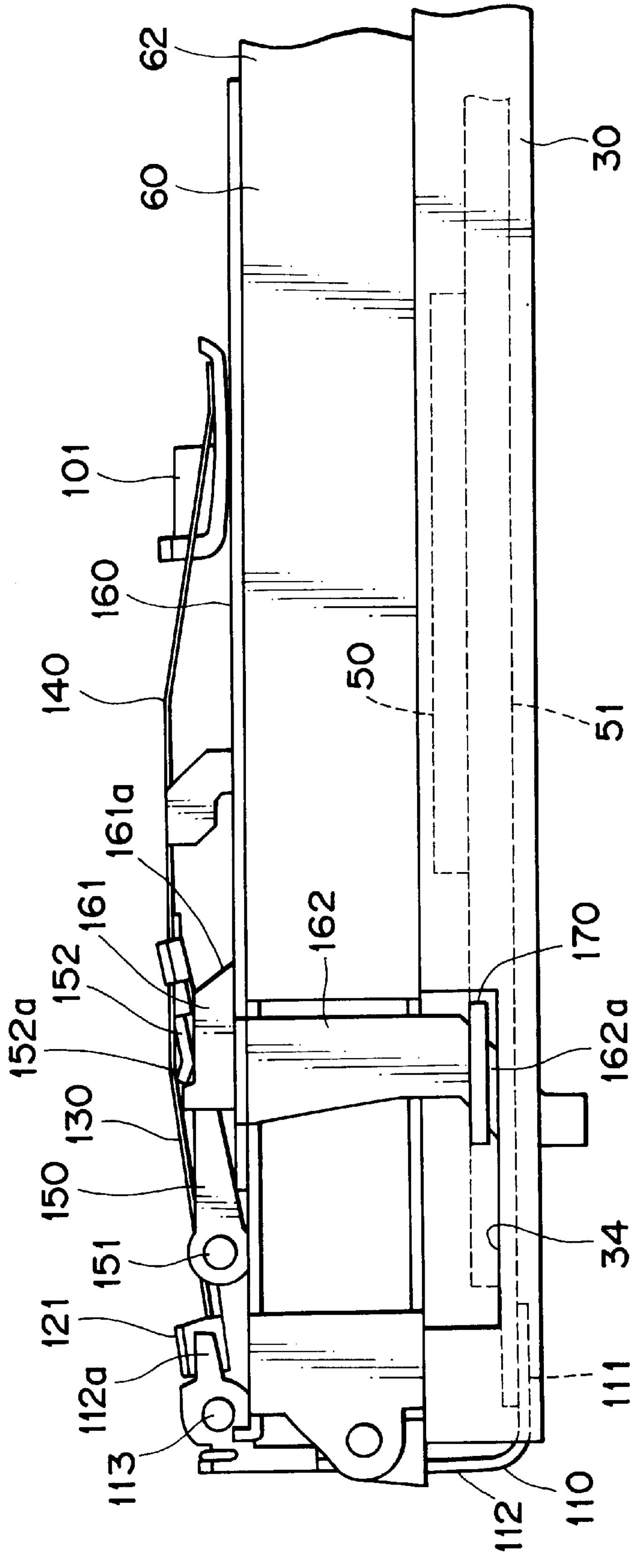
FIG. 16 is a schematic left side elevational view for showing a magnetic head ascending or descending mechanism at the time of stopped state of the recording and reproducing apparatus.
Figure 17:
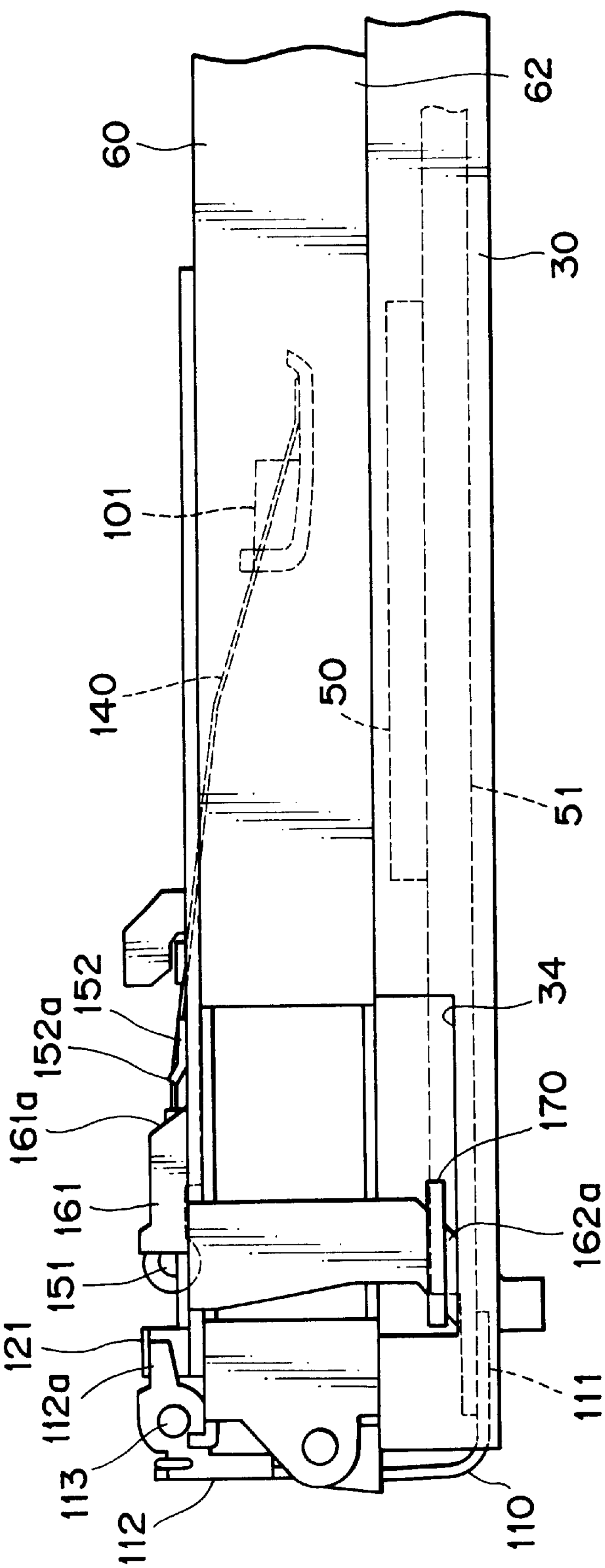
FIG. 17 is a schematic left side elevational view for showing a magnetic head ascending or descending mechanism at the time of recording operation of the recording and reproducing apparatus.

As shown in FIGS. 15 to 17, the connecting arm 110 has a section which is formed to be bent in a substantial L-shape, a lower piece 111 is fixed to the lower surface of a carriage 51 of the optical pick-up 50 by a screw setting or the like and then the rising piece 112 is raised upwardly at the rear side of the optical pick-up 50. The rising piece 112 of the connecting arm 110 is positioned at a more rear side of the rear end of the mechanical chassis 30 and it is moved together with the optical pick-up 50 without being abutted against the mechanical chassis 30.

As shown in FIGS. 7, 8, 15, 16 and 17, the upper end of the rising piece 112 is positioned at a higher location than the upper surface of the mechanical chassis 30. A rear end of the magnetic head supporting plate 120 is rotatably attached near the upper end of the rising piece 112 of the connecting arm 110 through a supporting shaft 113. As shown in FIGS. 7 and 8, the front end of the supporting plate 120 is rotatable in a vertical direction, i.e. in a direction moving toward or away from the mechanical chassis 30. A position setting projection piece 121 is projected from a side edge of the rear end of the magnetic head supporting plate 120 toward a side part of it. In turn, a position setting projection piece 112*a* is projected from the upper end of the rising piece 112 of the connecting arm 110 in a forward direction. The position setting projection piece 121 is positioned above the position setting arm 112*a* and its motion toward a downward direction is restricted when it is abutted against a part near the extremity end of the position setting arm 112*a*, thereby a range of motion of the magnetic head supporting plate 120 in a downward direction is restricted.

As shown in FIGS. 7, 8, 15, 16 and 17, a base end of the magnetic head supporting arm 130 is fixed to the magnetic head supporting plate 120. This magnetic head supporting arm 130 has a concave shape extending in a forward or rearward direction as viewed from above and opened in a rightward direction.

A base end of a gimbal spring 140 is fixed to the magnetic head supporting plate 120. A part near the front end of the gimbal spring 140 is mounted on the extremity end 131 bent toward a side of the magnetic head supporting arm 130. A magnetic head 101 is fixed to the front end of the gimbal spring 140.

The magnetic head 101 supported in this way is positioned above the objective lens 52 of the optical pick-up 50 and oppositely faced against the objective lens 52. In addition, the magnetic head 101 is movable in a direction ascending or descending in respect to the mechanical chassis 30 by a method wherein the magnetic head supporting plate 120 is rotated in respect to the connecting arm 110 as shown in FIGS. 9 and 10 and at the same time, its position setting is carried out in a descending direction through abutment between the position setting projection piece 121 and the position setting arm 112*a* as shown in FIGS. 15 to 17.

A twisting coil spring 114 is arranged at one end of the supporting shaft 113. The twisting coil spring 114 is set such that its coil part 114*a* is present between a base end of the position setting arm 112*a* and a base end of the magnetic head supporting plate 120, each of the arms 114*b*, 114*c* is engaged respectively with the position setting arm 112*a* and the magnetic head supporting plate 120, the magnetic head supporting plate 120 is set in its position in a sidewise direction and the magnetic head 101 is biased to rotate in a downward direction in respect to the connecting arm 110 at the magnetic head supporting plate 120.

As shown in FIG. 8, an electric current based on a recording signal attained through the base ends of the magnetic head 101 and of the magnetic head supporting arm 130 and the flexible substrate 102 adhered to the gimbal spring 140 is supplied to the magnetic head 101.

As shown in FIGS. 7 and 8, a top plate 61 of a cartridge holder 60 is formed with an opening 61*a* in correspondence with a movable region as the magnetic head supporting arm 130 and the optical pick-up 50 of the gimbal spring 140. That is, the magnetic head 101 is placed near the main plane part of the upper surface of the disk cartridge 2 held in the cartridge holder 60 through an opening 61*a*.

There is provided a mechanism for ascending or descending the magnetic head 101. As shown in FIGS. 7, 8, 15, 16 and 17, the ascending or descending mechanism is comprised of a magnetic head ascending or descending plate 150 and a transmitting slider 160 arranged at the upper surface of the cartridge holder 60, and a magnetic head ascending or descending slider 170 arranged at the lower surface of the mechanical chassis 30 and for sliding the transmitting slider 160, thereby the magnetic head 101 is ascended or descended by these members.

The magnetic head ascending or descending plate 150 is positioned below the magnetic head supporting arm 130 and the gimbal spring 140 in such a way that the rear part of the opening 61*a* formed at the top plate 61 of the cartridge holder 60 is closed. The magnetic head ascending or descending plate 150 is rotatably supported at its rear end in respect to the top plate 61 of the cartridge holder 60 through the supporting shafts 151, 151. As shown in FIG. 15, when the magnetic head ascending or descending plate 150 is rotated upwardly, the magnetic head supporting arm 130 is pushed up toward the gimbal spring 140 and the magnetic head supporting plate 110, the gimbal spring 140 and the magnetic head supporting arm 130 are rotated around the supporting shaft 113 and pushed up. When the magnetic head ascending or descending plate 150 is rotated in a downward direction, a part of the front end portion is abutted against the top plate 61 of the cartridge holder 60, made in flush with the top plate 61 and its position is set. At this time, the magnetic head supporting arm 130 is rotated in a downward direction up to a position where the position setting projection piece 121 of the magnetic head supporting plate 120 is abutted against the position setting arm 112*a*.

With such an arrangement as above, the gimbal spring 140 is operated such that the front end of the spring 140 is lowered to a lower position than that of the top plate 61 of the cartridge holder 60 and the magnetic head 101 supported at the front end is positioned at a lower location than that of the top plate 61 of the cartridge holder 60.

As shown in FIGS. 7 and 8, an abutting piece 152 projected in a leftward direction is arranged at the left edge of the magnetic head ascending or descending plate 150 and the rear end of the abutting piece 152 is applied as a slant part 152*a* inclined in a rear upward direction. A spring abutting piece 153 is projected and arranged in a rightward direction at a part near the front end of the right edge of the magnetic head ascending or descending plate 150, the rear end of the leaf spring 154 fixed at its front end to the top plate 61 of the cartridge holder 60 is resiliently from above contacted with the spring abutting piece 153 and the magnetic head ascending or descending plate 150 is biased at its front end to rotate in a direction moving in a downward direction.

As shown in FIGS. 7 and 8, the transmitting slider 160 is arranged at a side part, i.e. the left side, opposite to the part where the opening 61*a* at the upper surface of the top plate 61 of the cartridge holder 60 is formed in such a way that the slider can be slid in a forward or rearward direction. As shown in FIG. 15, the transmitting slider 160 has a pushing-up projecting piece 161 positioned at the right side edge of the slider 160, i.e. a substantial central part of the cartridge holder 60, and at a portion near the abutting piece 152 at the left edge of the magnetic head ascending or descending plate 150. The front end of the upper edge of the pushing-up projecting piece 161 is a slant edge 161*a* inclined in a forward downward direction.

As the transmitting slider 160 is slid from the rear side to the front side, the pushing-up projecting piece 161 is advanced into a location between the abutting piece 152 of the magnetic head ascending or descending plate 150 and the top plate 61 of the cartridge holder 60 while the slant edge 161*a* is being slidably contacted with the slant part 152*a* of the magnetic head ascending or descending plate 150. Then, as shown in FIGS. 15 and 16, the magnetic head ascending or descending plate 150 is rotated in an upward direction against a rotating force biased by the leaf spring 154.

As the transmitting slider 160 is slid from its front side to its rear side, the pushing-up projecting piece 161 is retracted in a rearward side from between the abutting piece 152 of the magnetic head ascending or descending plate 150 and the top plate 61 of the cartridge holder 60 while the slant edge 161*a* is being slidably contacted with a slant part 152*a* of the magnetic head ascending or descending plate 150. Then, as shown in FIG. 17, the magnetic head ascending or descending plate 150 is rotated in a downward direction and returned back to its initial position with a rotating force biased by the leaf spring 154.

In addition, as shown in FIGS. 15 to 17, the transmitting slider 160 has a cooperating arm 162 vertically suspended from the rear end of the left side of the slider 160 to the mechanical chassis 30. The lower end 162*a* of the cooperating arm 162 is inclined in such a way as it may be displaced rearwardly as it goes downwardly and it may move along a substantial arcuate path around a rotating fulcrum point of the cartridge holder. The lower end 162*a* of the cooperating arm 162 is projected to a downward side of the mechanical chassis 30 through a through-pass hole 84 arranged at the rear end of the left side of the mechanical chassis 30.

As shown in FIGS. 7, 8, 13 and 14, the magnetic head ascending or descending slider 170 is slidably arranged at the left side of the lower surface of the mechanical chassis 30 in the directions X and Y in FIGS. 7, 8, 13 and 14. The magnetic head ascending or descending slider 170 is formed by a metallic sheet material and the rear end of the slider 170 is formed with a rack-gear part 171 extending in the directions of arrows X, Y. The rack-gear part 171 is engaged with a pinion gear 174 rotated through a row of gears 173 by a stepping motor 172 fixed to the left rear portion of the lower surface part of the mechanical chassis 30. With such an arrangement as above, the magnetic head ascending or descending slider 170 is moved in directions indicated by arrows X, Y in response to the operation mode of the recording and reproducing apparatus 1.

At the rear end of the magnetic ascending or descending slider 170 is provided an engaging hole 175 at a position corresponding to the through-pass hole 34 formed at the mechanical chassis 30. A lower end 162*a* of the cooperating arm 162 of the transmitting slider 160 is inserted into and engaged with the engaging hole 175 through the through-pass hole 34. That is, as the magnetic head ascending or descending slider 170 is slid in the directions of arrows X, Y, the transmitting slider 160 is slid in the directions of arrows X, Y in respect to the cartridge holder 60. With such an arrangement as above, since the magnetic head ascending or descending plate 150 is rotated, the magnetic head 101 is operated to ascend or descend. In addition, the lower end 162*a* of the cooperating arm 162 extends along a substantial arcuate part around a rotating fulcrum of the cartridge holder 60 as described above, so that even if the cartridge holder 60 is rotated, it is always inserted into and engaged with the engaging hole 114.

However, as the magnetic head ascending or descending slider 170 is slid in any one of the directions of arrows X, Y under a driving operation of the stepping motor 172, the transmitting slider 160 is slid in any one of the directions of arrows X, Y through an engagement between the engaging hole 175 and the cooperating arm 162 and then the magnetic head ascending or descending plate 150 is rotated.

As shown in FIGS. 29 to 31, an engaged member 180 is projected at a substantial central part of the inner surface of the front wall 13*c* of the upper cover 13. The engaged member 180 is provided with the engaged surface 181 at the upper surface of the member 180. The engaged surface 181 is engaged with the lock slider 190 slidably attached to the front surface 22 of the main frame 20 and the upper cover 13 is held at its lid closed state.

Figure 28:
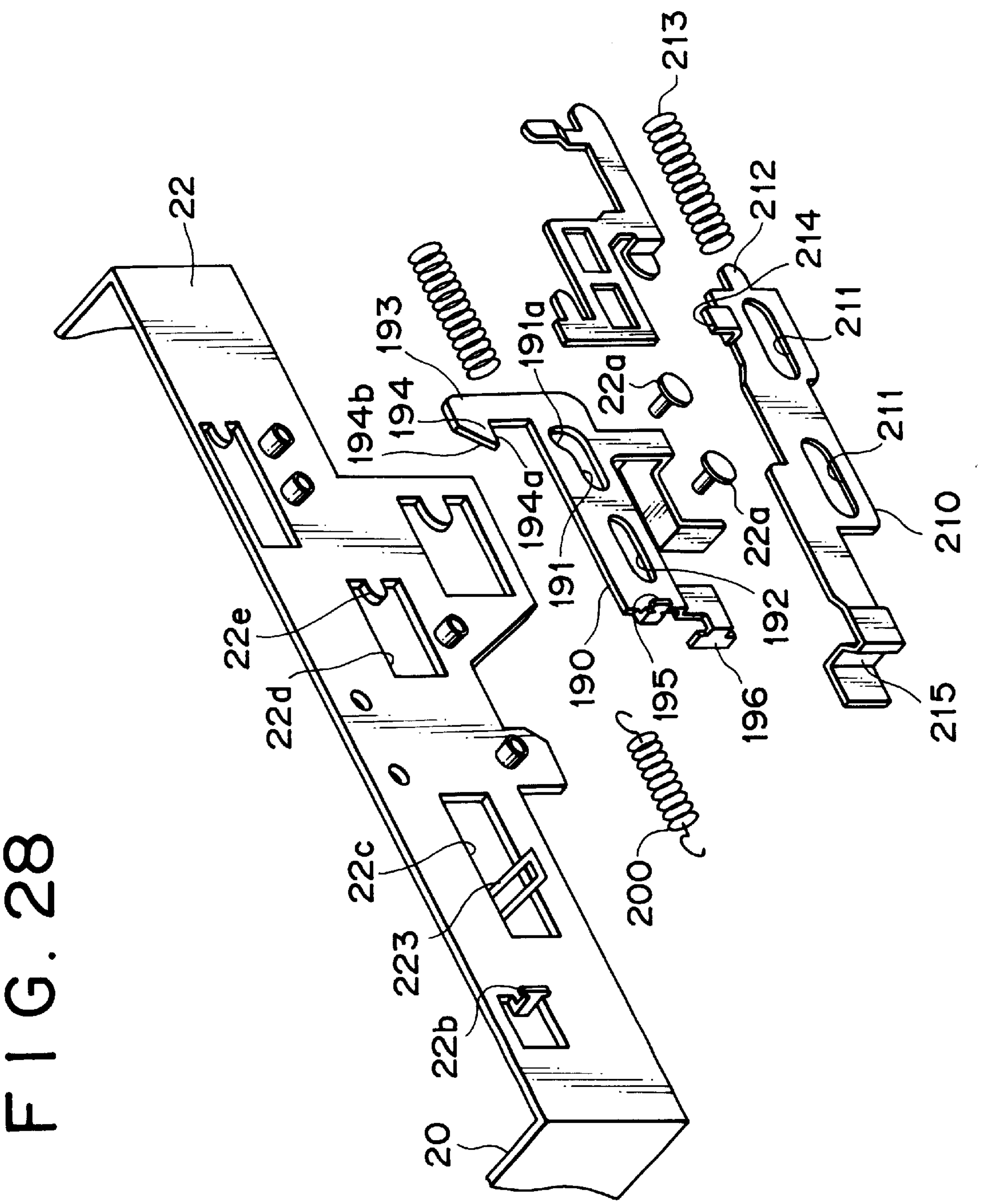
FIG. 28 is an exploded perspective view for showing a substantial part to illustrate a mechanism for locking an upper cover to a lid closing position.

As shown in FIG. 28, the lock slider 190 has two supporting slits 191, 192 spaced apart in a longitudinal direction. The lock slider 190 is slidably supported in respect to the main frame 20 by an arrangement in which supporting pins 22*a*, 22*a* installed at the front surface 22 of the main frame 20 are inserted into these supporting slits 191, 192. The lock slider 190 at its right end is provided with a lock piece 193 projected upwardly and the upper end of the lockpiece 193 is provided with a lock claw 194 projected in a leftward direction. A lower edge of the lock claw 194 is applied as an engaging edge 194*a* and an upper edge of the claw 194 is applied as a left-downward directed slant edge 194*b*. As shown in FIG. 29, when the upper cover 13 is in a lid closed state, the lock slider 190 is set such that the engaging edge 194*a* is engaged with the engaged surface 181 of the engaged member 180 of the upper cover 13 so as to prevent the upper cover 13 from opening the lid.

In addition, the right slit 191 of the supporting slits 191, 192 is set such that the right half part 191*a* is inclined in a slant upward direction. Accordingly, as shown in FIG. 29, a height of the engaged edge 194*a* kept at a state in which the lock slider 190 is present at the left end in the moving range is set to be lower than a state in which the lock slider 190 is present at the right end of the moving range of the lock slider 190 shown in FIG. 31. Thus, during a step in which the lock slider 190 is moved from the right side to the left side, the engaging edge 194*a* is moved from a high position to a low position, so that it may be positively engaged with the engaged surface 181 of the upper cover 13 and then the upper cover 13 can be positively locked at the lid closing position.

A tensile coil spring 200 is arranged in tension between a spring hook piece 195 formed at the left end of the lock slider 190 and a spring hook piece 22*b* formed at the left end part of the front surface 22 of the main frame 20. A leftward biasing force is applied to the lock slider 190 by the tensile coil spring 200.

The lower part of the left end of the lock slider 190 is provided with a pushed piece 196 projected in a rearward direction. The pushed piece 196 is advanced into the rear side of the front surface 22 through a lateral through-pass hole 22*c* formed at the portion near the left end of the front surface 22 of the main frame 20.

As shown in FIG. 30, when the upper cover 13 is closed, the slant edge 194*b* of the lock slider 190 is pushed by the engaged member 180, and the lock slider 190 is moved in a rightward direction. Upon completion of the lid closing of the upper cover 13, the lock slider 190 is moved in a leftward direction by a tension force of the tensile coil spring 200 shown in FIG. 29 due to the fact that its lock claw 194 is positioned at a higher location than that of the engaged surface 181 of the engaged member 180, and is returned back to its initial position, its engaged edge 194*a* is engaged with the engaged surface 181 of the upper cover 13 so as to lock the upper cover 13 in its lid closed state.

As shown in FIG. 28, an ejecting slider 210 is slidably supported in a lateral direction just below the portion of the front surface of the front surface section 22 of the main frame 20 where the lock slider 190 is arranged. The ejecting slider 210 is formed with two lateral supporting slits 211, 211 spaced apart in a lateral direction. Supporting projections projected in a protrusion form at the front surface section 22 of the main frame 20 are inserted into the supporting slits 211, 211 and the ejecting slider 210 is slidably supported at the main frame 20 in a lateral direction.

A right end of the ejecting slider 210 is provided with a spring fitting piece 212 projected in a rightward direction. The spring fitting piece 212 is positioned in a lateral through-pass hole 22*d* formed at the front surface section 22 of the main frame 20. There is provided a spring fitting piece 22*e* projected from the right end of the through-pass hole 22*d* in a leftward direction. Both ends of the compression coil spring 213 is fitted to each of spring fitting pieces 212, 22*e* under a state in which the compression coil spring 213 is being compressed, and the ejecting slider 210 is biased in a leftward direction.

A pressed piece 214 is projected from an upper edge of the right end of the ejecting slider 210 to an upward direction. Its left end is formed with a pressing piece 215 projected in a slight upward direction and projected in a rearward direction. The pressing piece 215 is advanced through the through-pass hole 22*c* formed at the front surface 22 of the main frame 20 in a rearward direction of the front surface 22. The pressing piece 215 and the pressed piece 196 of the lock slider 190 are spaced apart and faced to be opposite to each other.

Figure 32:
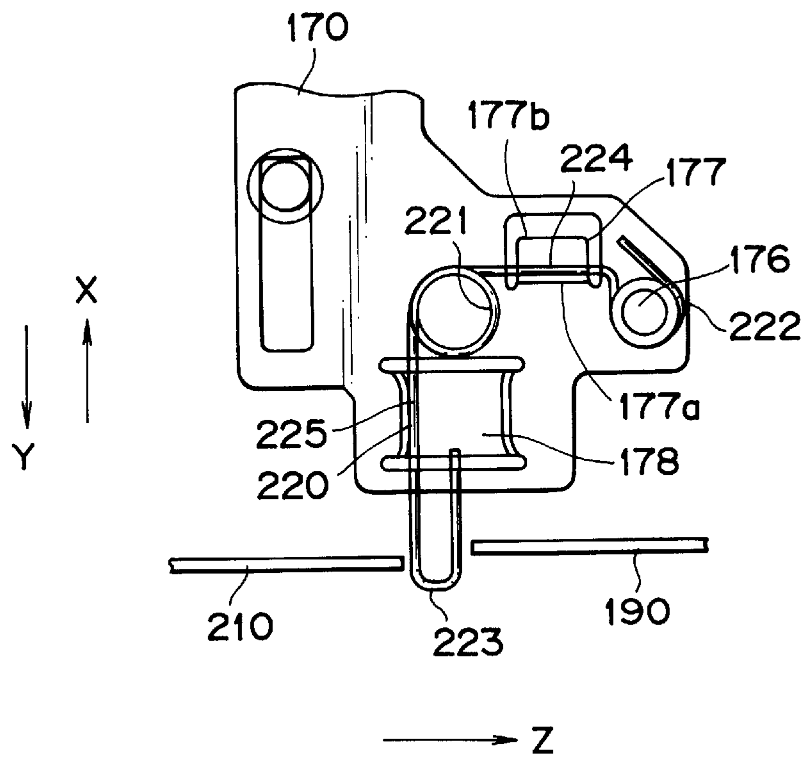
Figure 33:
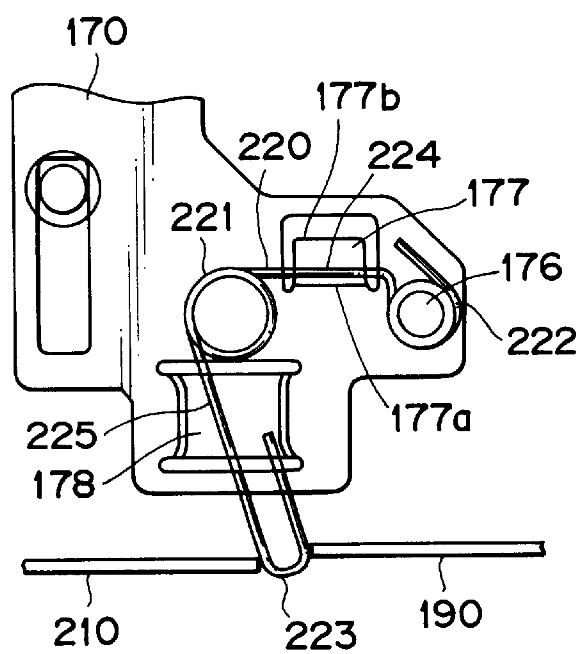

As shown in FIG. 32, the ejection transmitting member 220 is fixed to the front end of the magnetic head ascending or descending slider 170. The ejection transmitting member 220 is formed by bending a wire spring material and its shape is formed in a substantial L-shape as viewed from above. A coil section 221 is formed at the L-shaped bent part, and a fixing part 222 formed in an incomplete circle at one end of the L-shaped bent part is arranged and at the same time the other end is provided with a transmitting section 223 bent into a U-shape.

The front end of the magnetic head ascending or descending slider 170 formed by metallic sheet material is formed with a supporting section 176, a pressing section 177 and a restricting section 178.

The supporting section 176 is formed as a cylinder punched out at its lower surface, the end part of the cylinder is fastened in an outward direction to form a larger diameter part than that of other portion. A fixing section 222 of the ejection transmitting member 220 is fitted to and inserted into the supporting section 176 while it is once flexed in an outward direction to expand its diameter, a force of flexing of the fixing section 222 under its state is removed and the fixing section 222 is fixed to a supporting part 176.

The pressing section 177 is formed with an abutting section 177*a* made by punching-out a part of the magnetic head ascending or descending slider 170 in a downward direction, bending the end part of the punched-out section in a rearward direction and facing toward the directions of arrows X, Y in FIG. 32, and with a stopper 177*b* directed toward a direction substantially crossing with a plane of the slider 170, i.e. toward a vertical direction.

The restricting section 178 is formed such that a part between the two parallel slits spaced apart in a forward or rearward direction and extending in a lateral direction is punched out in a downward direction and formed into a tunnel extending in a forward or rearward direction.

As show in FIGS. 7, 13 and 32, the ejection transmitting member 220 having the fixing section 222 supported at the supporting section 176 is set to a state in which an arm section 224 at the fixing section 222 is abutted from the coil section 221 against the abutting section 177*a* of the pressing section 177 from a rear side, the arm section 225 at the transmitting section 223 is inserted into and passed through the restricting section 178 from the coil section 221 and it is abutted against the left side surface of the restricting section 178. Under this state, the portion except the rear end of the transmitting section 223 is projected from the front end of the magnetic head ascending or descending slider 170 in a forward direction, the magnetic head ascending or descending slider 170 is positioned at the front end in its moving range, the transmitting section 223 is inserted into and passed through a part between the pressed piece 196 of the lock slider 190 and the pressed piece 215 of the ejecting slider 210 and it is projected from the main frame 20 in a forward side.

Figure 36:
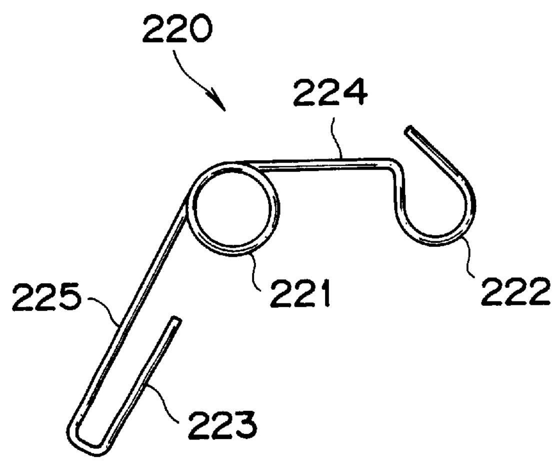
FIG. 36 is a top plan view for showing an ejection transmitting member before it is fixed to the magnetic head ascending or descending slider.

The ejection transmitting member 220 is formed to have an L-shape under a state in which it is fixed to the magnetic head ascending or descending slider 170 as described above and before it is fixed to the magnetic head ascending or descending slider 170, an angle of the bent part is set to be larger than 90° as shown in FIG. 36.

An ejection knob 230 is slidably supported at the front surface of the front wall 11*a* of the lower case 11 in a lateral direction as shown in FIGS. 7 and 8. A connecting section 231 is projected and arranged at the rear surface of the ejection knob 230 and then the pressed piece 214 of the ejection slider 210 is engaged with the connecting section 231.

Under a stopped state of the recording and reproducing apparatus 1, when the ejection knob 230 is slid in a rightward direction, i.e. a direction indicated by an arrow Z in FIG. 4, the ejection slider 210 is slid in a rightward direction, i.e. a direction indicated by the arrow Z, against a resilient force of the compression coil spring 213, resulting in that the pressing piece 215 moved in a rightward direction pushes the transmitting section 223 of the ejection transmitting member 220 in a direction indicated by the arrow Z. The ejection transmitting member 220 in which the transmitting section 223 is pushed by the pressing piece 215 of the ejection slider 210 in a rightward direction, i.e. a direction indicated by the arrow Z is operated such that its arm 225 is flexed from the coil section 221 in a rightward direction, thereby the transmitting section 223 moved in a rightward direction in a direction indicated by the arrow Z pushes the pressed piece 196 of the lock slider 190 in a rightward direction. As shown in FIGS. 30 and 31, the lock slider 190 is moved in a rightward direction, i.e. a direction indicated by the arrow Z, the engaged edge 194*a* is released from the engaged surface 181 of the engaged member 180 of the upper cover 13 in a rightward direction, a direction indicated by the arrow Z, and the engaged state between the lock claw 194 of the lock slider 190 and the engaged member 180 of the cover 13 is released.

Figure 34:
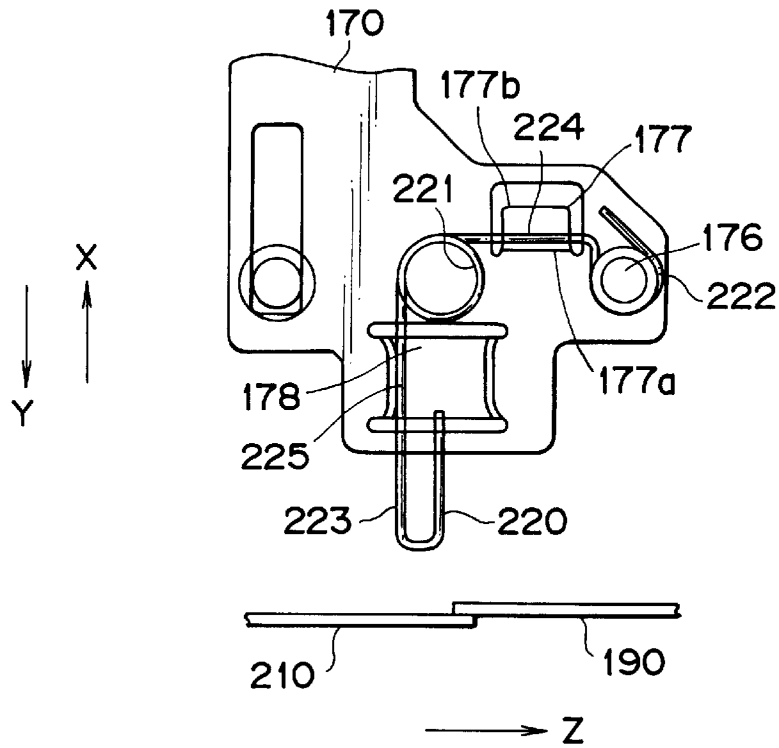

As the engaged state between the lock claw 194 of the lock slider 190 and the engaged member 180 of the upper cover 13 is released, the upper cover 13 is rotated in an upward direction with a resilient force of the pressing spring 13*b*. When a user holds the front end of the upper cover 13 and moves the upper cover 13 in an upward direction, the upper cover 13 is further rotated in an upward direction. At this time, the lower end opening edge of the connecting hole 21*a* of the supporting arm 21 rotated together with the upper cover 13 pushes the connecting piece 62*a* of the cartridge holder 60 in an upward direction and then the cartridge holder 60 is rotated in an upward direction. The cartridge holder 60 is rotated in an upward direction, the lock member 80 is moved downwardly in respect to the cartridge holder 60, the engaged section 81*a* of the lock member 80 is released from the moving path of the engaged piece 71*c* of the release slider 70 in a downward direction, so that the release slider 70 is moved in a forward direction by a tension force of the tensile coil spring 73, its abutting piece 72*a* pushes the right end of the front end surface of the disk cartridge 2 in a forward direction and the disk cartridge 2 is projected at its rear end from the front end of the cartridge holder 60. If a user holds the portion projected from the front end of the cartridge holder 60 of the disk cartridge 2 and pulls it, it is possible to take out the disk cartridge 2 from the cartridge holder When the aforesaid ejection of the disk cartridge is carried out or the aforesaid taking-out of the disk cartridge is performed during a recording or reproducing operation, there is a possibility that information written in the magneto-optic disk 2 is lost or either the disk cartridge 2 or the magnetic head 101 is damaged, so that in the case that the ejection knob 230 is erroneously slid in a direction indicated by the arrow Z in FIG. 4 during a recording operation or during a reproducing operation, it is necessary to prevent an ejecting operation from being performed. Due to this fact, during the reproducing operation and the recording operation, the stepping motor 172 is driven as indicated in FIGS. 8, 14 and 34, the magnetic head ascending or descending slider 170 is moved in a direction indicated by an arrow X in FIG. 8 and the transmitting section 223 of the ejection transmitting member 220 is moved away from the position between the pressed piece 196 of the lock slider 190 and the pressed piece 215 of the ejecting slider 210. The state shown in FIGS. 8, 14 and 34 is kept until the recording operation on the magneto-optic disk 2 is completed. The completion of the recording operation as defined in the present invention is meant by a state in which recording of data in the data recording region in the magneto-optic disk is completed, the recording of monitoring data such as a starting address or an end address recorded in the data recording region under a present recording operation is finished at the region where the monitoring data of the magneto-optic disk 2 is recorded. In addition, the state shown in FIGS. 8, 14 and 34 is kept in the same manner as that of the aforesaid recording operation until the reproducing operation is completed. The finished reproducing operation is defined as one in which the rotation of the magneto-optic disk is stopped and the radiation of the optical beam from the optical pick-up 50 is stopped.

Accordingly, even if the ejecting slider 210 is slid in a rightward direction, i.e. a direction indicated by the arrow Z as the ejecting knob 230 is slid in a rightward direction, a direction indicated by the arrow Z in FIG. 4, until the reproducing operation or the recording operation is finished, the pressing piece 215 of the slider 210 is merely moved in a rightward direction in a space between it and the pressed piece 196 of the lock slider 190 producing a vacant region under a retracting motion of the transmitting section 223 of the ejection transmitting member 220, resulting in that it does not push the pressed piece 196 in a rightward direction. Accordingly, as shown in FIG. 34, even if the pressed piece 215 of the ejecting slider 210 is moved in a rightward direction, i.e. a direction indicated by the arrow Z, a so-called non-operating state occurs and the lock slider 190 is not slid in such a direction as one in which the locked state of the upper cover 13 is released. Accordingly, the upper cover 13 is not opened and the ejecting operation is not carried out.

Moving amounts of the magnetic head ascending or descending slider 170 in each of the reproducing operation and the recording operation are made different. That is, in the case of reproducing operation, a moving amount of the magnetic head ascending or descending slider 170 during the reproducing operation is low, resulting in that a sliding amount of the transmitting slider 160 in a rearward direction, i.e. a direction indicated by the arrow X in FIG. 7, for example, and the abutting piece 152 of the magnetic head ascending or descending plate 150 is kept at its mounted state on the upper edge of the pushing-up projecting piece 161 of the transmitting slider 160. Accordingly, as shown in FIG. 16, for example, the magnetic head 101 is kept at a state in which it is spaced apart in an upward direction from the upper main plane of the disk cartridge 2 held at the cartridge holder 60.

During the recording operation, as shown in FIGS. 8, 14 and 17, the magnetic head ascending or descending slider 170 is slid more rearwardly than that of the reproducing operation, i.e. in a direction indicated by the arrow X in FIG. 8, and accordingly the transmitting slider 160 is also slid more rearwardly than that of the reproducing operation, i.e. in a direction indicated by the arrow X and the abutting piece 152 of the magnetic head ascending or descending plate 150 is moved away from the upper edge of the pushing-up projecting piece 161 of the transmitting slider 160. Accordingly, as shown in FIG. 17, the magnetic head 101 is moved from the magnetic head opening 5 of the disk cartridge 2 held at the cartridge holder 60 into the cartridge 4 and then it is contacted with or moved toward the magneto-optic disk 3.

When the recording and reproducing apparatus 1 completes either the reproducing operation or the recording operation and its operation is changed over to a stopped state, the stepping motor 72 is driven in the opposite direction against the case in which the reproducing operation and the recording operation are carried out, thereby the transmitting section 223 of the ejection transmitting member 220 is positioned between the pressed piece 195 of the lock slider 190 and the pressed piece 215 of the ejecting slider 210.

Figure 35:
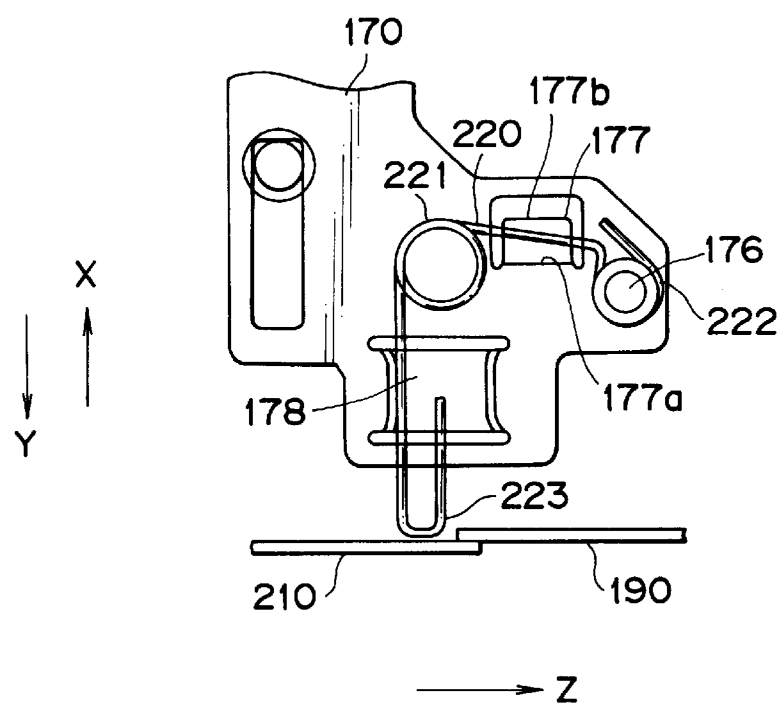

In addition, in the case that there is scarcely found a time difference between a stopping operation and the ejecting operation and the ejecting knob 230 has been slid in a rightward direction and the ejecting slider 210 has been moved in a rightward direction, i.e. in a direction indicated by the arrow Z in FIG. 35 before the transmitting section 223 of the ejection transmitting member 220 is positioned between the pressed piece 195 of the lock slider 190 and the pressed piece 215 of the ejecting slider 210, the transmitting section 223 is abutted against the rear surface of the ejecting slider 210 as shown in FIG. 35 due to the fact that the ejection transmitting member 220 is formed by a wire spring material, resulting in that a bending state becomes deep at the location of the coil 221 by resiliency of the material constituting the transmitting member 220, the transmitting member 220 realizes a function as the limiter and then it is possible to avoid damage of the magnetic head ascending or descending slider 170 and the ejecting slider 210 or the like. Additionally, in such a case as above, although the arm 224 of the ejection transmitting member 220 is moved away from the abutted section 177*a* of the pressing part 177 of the magnetic head ascending or descending slider 170 as shown in FIG. 35, the arm 224 is prevented from being moved away from the pressing part 177 due to the fact that the stopper section 177*b* is positioned at the lower side of the pressing section 177.

Figure 37:
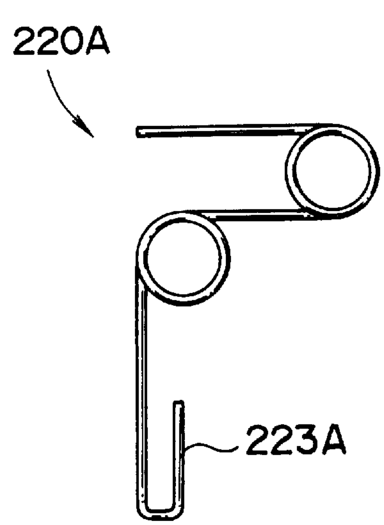
FIG. 37 is a top plan view for showing an example of modification of the ejection transmitting member.
Figure 38:
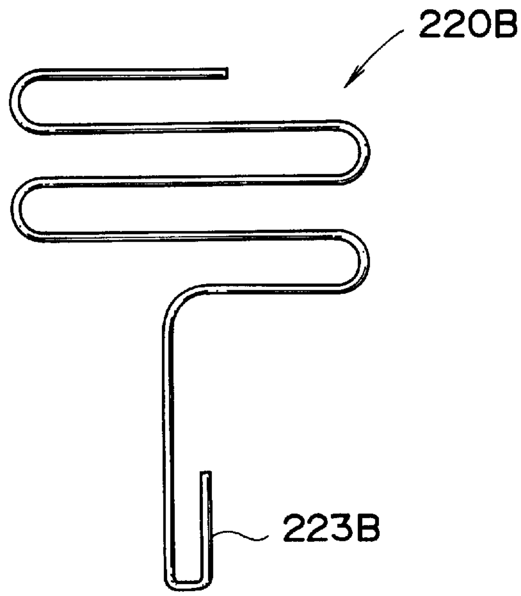
FIG. 38 is a top plan view for showing another example of modification of the ejection transmitting member.
Figure 39:
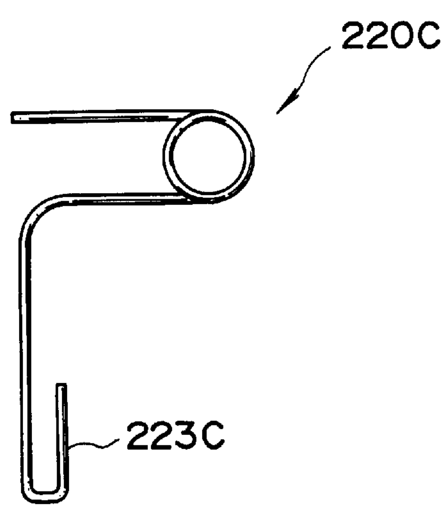
FIG. 39 is a top plan view for showing a still further example of modification of the ejection transmitting member.

In addition, as the ejection transmitting member, the member shown in FIGS. 37 to 39 in addition to the constitution shown in FIG. 32 can be used as the ejection transmitting member.

Each of the ejection transmitting members 220A, 220B and 220C shown in FIGS. 37 to 39 has transmitting sections 223A, 223B and 223C formed by bending a wire spring material, formed into a substantial U-shape and having a predetermined width, a predetermined location of each of them is supported by or pressed by the magnetic head ascending or descending slider 170, thereby they may provide the same actions and effects as those of the ejection transmitting member 220 shown in FIG. 32.

Figure 40:
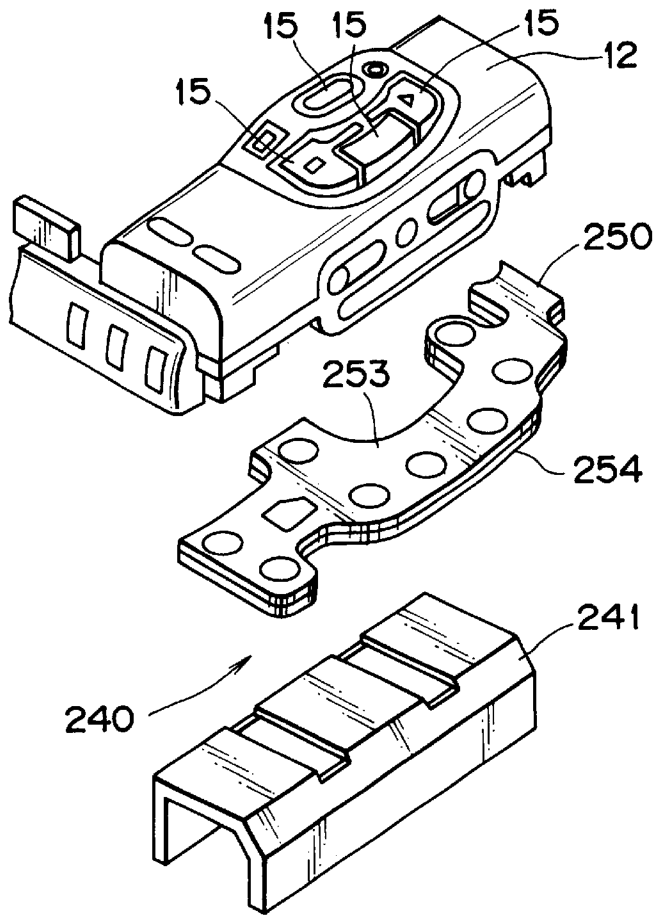
FIG. 40 is an exploded perspective view for showing a substantial part of an upper case and a switch unit.
Figure 41:
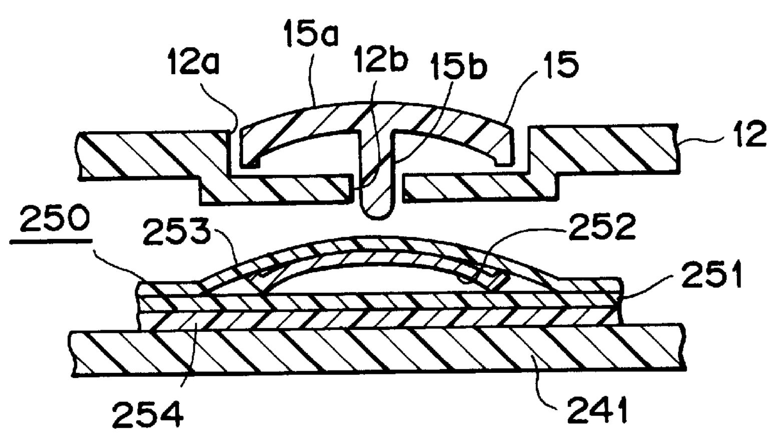
FIG. 41 is a sectional view for showing a substantial part of an upper case and a switch unit.

As shown in FIGS. 40 and 41, there is provided a battery storing space 240 opened at a rear surface by the right end section of the lower case 11 and the upper case 12 of the recording and reproducing apparatus 1 and then a battery holder 241 is arranged in and fixed at the battery storing space 240.

A switch unit 250 is arranged at the upper surface of the battery holder 241. The switch unit 250 is comprised of a switch unit substrate in which some short-circuited plates 252, 252, . . . (only one of them is shown in FIG. 41) are arranged at positions corresponding to some switch patterns in a flexible printed substrate 251 formed with some switch patterns not shown and the pattern forming surface of the flexible printed circuit substrate 251 and the short circuited plates 252, 252, . . . are covered by a protection cover film 253; and a reinforcing plate 254 laminated at the rear surface of the switch unit substrate, i.e. the surface opposite to the pattern forming surface of the flexible printed circuit substrate 251.

The short-circuited plate 252 is formed into a substantial flat-dome shape by a metallic plate having an electrical conduction and a spring resiliency as shown in FIG. 41, its projected portion is pressed from above to be deformed into a flat shape so as to make a short-circuited state between the switch patterns of the flexible printed circuit board. The reinforcing plate 254 is formed by material having a high rigidity, for example, SUS and this reinforcing plate prevents the flexible printed circuit board 251 from being deformed into a downward direction when the short-circuited plate 252 is depressed from above, and further prevents a short-circuiting between the switch patterns caused by the short-circuited plate 252 from becoming non-positive. Accordingly, there occurs no possibility that a location where the switch unit 250 is arranged is not limited to a location having a flat installing surface.

As shown in FIG. 41, an operating button 15 is constructed such that a depressed section 15*a* having a predetermined shape as seen from its top plan view and a depressing protrusion 15*b* projected from a substantial central part of a rear surface of the depressed section 15*a* are integrally formed. The depressed section 15*a* is arranged within a concave part 12*a* formed in the upper case 12 and having a shape corresponding to the depressed section 15*a*, wherein the depressing protrusion 15*b* is inserted into the insertion hole 12*b* formed at the concave part 12*a* and the extremity end of the depressing protrusion 15*b* is oppositely faced against the short-circuited plate 252 of the switch unit 250 through a cover film 253. When the depressed section 15*a* of the operating button 15 is depressed by a user's finger, the depressing protrusion 15*b* depresses the short-circuited plate 252 of the switch unit 250 through a cover film 253 so as to cause the switch patterns of the flexible printed circuit board 251 to be short circuited. Since this switch unit 250 is provided with a reinforcing plate 254, there is no possibility that the flexible printed circuit board 251 is deformed to eliminate a depressing force as the operating button 15 is depressed and further since the reinforcing plate 254 positively receives the depressing force applied by the operating button 15, the short-circuited plate 252 is positively deformed from the flat dome shape to a flat state to cause the switch patterns of the flexible printed circuit board 251 to be positively short circuited and at the same time a click feeling when the short-circuited plate 252 is deformed is transmitted to an operating person through the operating button 15, and a comfortable operating feeling can be attained.

If the reinforcing plate 254 is not provided, the flexible printed circuit board 251 is deformed when the operating button 15 is depressed. There is a possibility that a repetition of deformation of this flexible printed circuit board 251 causes the wiring patterns arranged at the flexible printed circuit board 251 to be broken. As described above, the reinforcing plate 254 is provided to prevent the flexible printed circuit board 251 from being deformed and then the wiring patterns are prevented from being cut.

As the user removes the finger from the operating button 15 to release the depressing against the depressed section 15*a* of the operating button 15, the short-circuited plate 252 returns to its original flat dome-shape with resiliency of its material and the operating button 15 is also returned to its original position.

Although not shown in the drawings, there is provided an appropriate drop-prohibiting mechanism so as to prevent the operating button 15 from being dropped off the concave section 12*a* and the insertion hole 12*b* of the upper case 12.

What is claimed is:

1. A recording apparatus for a recording medium comprising:

a main body;

a lid rotatably arranged at the main body of the apparatus;

a lock mechanism for locking said lid against said main body of the apparatus;

an operating mechanism arranged at said main body of the apparatus; and a transmitting mechanism arranged between said operating mechanism and said lock mechanism, said transmitting mechanism having a resilient displacement member for transmitting an operation performed by said operating mechanism to said lock mechanism, said resilient displacement member being moved between a transmitting position where an operation of said operating mechanism is transmitted to said lock mechanism so as to release a locked state of said lid with said lock mechanism and a non-transmitting position where said resilient displacement member is retracted from said lock mechanism and functions as a limiter mechanism.

2. The recording apparatus according to claim 1, wherein said resilient displacement member is provided with a resilient displacement section resiliently displaced by said operating mechanism to release the locked state of said lid with said lock mechanism.

3. The recording apparatus according to claim 2, wherein said apparatus is provided with a moving mechanism for use in moving said resilient displacement member between said transmitting position and said non-transmitting position.

4. The recording apparatus according to claim 3, wherein said moving mechanism moves said resilient displacement member from said transmitting position to said non-transmitting position at least until said apparatus completes a recording operation for the recording medium.

5. The recording apparatus according to claim 2, wherein said apparatus is provided with a releasing mechanism for releasing the locked state of said lid with said lock mechanism and said releasing mechanism is resiliently displaced by said operating mechanism and then the locked state of said lid with said lock mechanism is released.

6. The recording apparatus according to claim 1, wherein said resilient displacement member is formed of a wire spring member.

7. A recording apparatus for a recording medium comprising:

a main body of the apparatus;

a recording section for performing a recording on a recording medium;

the main body of the apparatus provided with said recording section;

a lid rotatably arranged on said main body of the apparatus;

a releasing mechanism for releasing a locked state of said lid locked at a closed position against said main body of the apparatus;

an operating mechanism arranged at said main body of the apparatus; and a transmitting mechanism arranged between said operating mechanism and said releasing mechanism, said transmitting mechanism having a resilient displacement member for transmitting an operation performed by said operating mechanism to said releasing mechanism, said resilient displacement member transmitting an operation of said operating mechanism to said releasing mechanism whereby the locked state of said lid is released by said releasing mechanism, said resilient displacement member being moved to a non-transmitting position retracted from said releasing mechanism, at least until a recording operation of said recording medium with said recording section is completed, where the resilient displacement member functions as a limiter mechanism.

8. The recording apparatus according to claim 7, wherein said recording section is provided with a head mechanism for performing the recording on the recording medium.

9. The recording apparatus according to claim 8, wherein said apparatus is provided with a moving mechanism for use in moving said head mechanism and wherein said resilient displacement member is moved by said moving mechanism between said retracted position and a position where an operation performed by said operating mechanism is transmitted to said releasing mechanism.

10. The recording apparatus according to claim 9, wherein said resilient displacement member is provided with a resilient displacement section resiliently displaced by said operating mechanism, and a locked state of said lid is released by said releasing mechanism under an operation in which said resilient displacement section is resiliently displaced by said operating mechanism.

11. The recording apparatus according to claim 7, wherein said resilient displacement member is formed by a wire spring member.

12. The recording apparatus according to claim 7, wherein said apparatus is provided with a lock mechanism for locking said lid at a position closed in respect to said main body of the apparatus, and said lock mechanism releases the locked state of said lid by said releasing mechanism.

13. A recording apparatus for a recording medium comprising:

a main body of the apparatus;

a head mechanism for performing a recording on the recording medium;

the main body of the apparatus provided with said head mechanism;

a lid rotatably arranged at said main body of the apparatus;

a releasing mechanism for releasing a locked state of said lid locked at a closed position against said main body of the apparatus;

an operating mechanism arranged at said main body of the apparatus; and a transmitting mechanism arranged between said operating mechanism and said releasing mechanism, said transmitting mechanism having a resilient displacement member for transmitting an operation performed by said operating mechanism to said releasing mechanism, said resilient displacement member being moved between a transmitting position where an operation of said operating mechanism is transmitted to said releasing mechanism to cause the locked state of said lid to be released by said releasing mechanism and a non-transmitting position where it is retracted from said releasing mechanism and functions as a limiter mechanism, said resilient displacement member being moved to said non-transmitting position during a period in which said head mechanism is being moved to a recording position where the recording is carried out on the recording medium.

14. The recording apparatus according to claim 13, wherein said apparatus is further provided with a moving mechanism for moving said head mechanism and wherein said resilient member of said transmitting mechanism is moved by said moving mechanism between said retracted position and a position where an operation performed by said operating mechanism is transmitted to said releasing mechanism.

15. The recording apparatus according to claim 14, wherein said resilient displacement member is provided with a resilient displacement section resiliently displaced by said operating mechanism, said resilient displacement section is resiliently displaced by said operating mechanism and the locked state of said lid is released by said releasing mechanism.

16. The recording apparatus according to claim 13, wherein said resilient displacement member is formed by a wire spring member.

17. The recording apparatus according to claim 13, wherein said apparatus is provided with a lock mechanism for use in locking said lid at a closed position against said main body of the apparatus.

* * * * *

UNITED STATES PATENT AND TRADEMARK OFFICE

CERTIFICATE OF CORRECTION

PATENT NO. : 6,249,501 B1
DATED : June 19, 2001
INVENTOR(S) : Tadami Nakamura et al.

It is certified that error appears in the above-identified patent and that said Letters Patent is hereby corrected as shown below:

Column 2,
Line 33, after (k), insert ".".

Column 9,
Line 39, change "sidewall" to -- side wall --.

Column 10,
Line 36, change "sprig" to -- spring --.

Column 19,
Line 51, after "holder", insert -- 60. --.

Signed and Sealed this

Twenty-sixth Day of March, 2002

*Attest:*

JAMES E. ROGAN

*Attesting Officer* *Director of the United States Patent and Trademark Office*